(12) United States Patent
Hibbs

(10) Patent No.: US 10,264,932 B2
(45) Date of Patent: Apr. 23, 2019

(54) WASTE ABSORBING FORMULATION WITH COMMUNICATION CAPABILITIES AND TOILET SYSTEMS FOR USE THEREOF

(71) Applicant: Hibbs Marketing Services LLC, Savannah, MO (US)

(72) Inventor: Curtis Randall Hibbs, Savannah, MO (US)

(73) Assignee: Hibbs Marketing Services LLC, Savannah, MO (US)

( * ) Notice: Subject to any disclaimer, the term of this patent is extended or adjusted under 35 U.S.C. 154(b) by 0 days.

(21) Appl. No.: 15/872,956

(22) Filed: Jan. 16, 2018

(65) Prior Publication Data

US 2018/0199770 A1 Jul. 19, 2018

Related U.S. Application Data

(60) Provisional application No. 62/447,192, filed on Jan. 17, 2017.

(51) Int. Cl.
| | |
|---|---|
| *A47K 11/03* | (2006.01) |
| *A47K 17/00* | (2006.01) |
| *B01F 11/00* | (2006.01) |
| *G05D 21/02* | (2006.01) |
| *B01J 20/28* | (2006.01) |

(Continued)

(52) U.S. Cl.
CPC ............. *A47K 11/03* (2013.01); *A47K 11/026* (2013.01); *A47K 17/00* (2013.01); *B01F 11/0042* (2013.01); *B01F 11/0045* (2013.01); *B01F 11/0094* (2013.01); *B01F 15/0022* (2013.01); *B01F 15/0085* (2013.01); *B01F 15/00285* (2013.01); *B01F 15/00837* (2013.01); *B01F 15/0251* (2013.01); *B01J 20/28009* (2013.01);
(Continued)

(58) Field of Classification Search
CPC ........................................................ A47K 11/03
USPC ............................................. 4/449, 464–470
See application file for complete search history.

(56) References Cited

U.S. PATENT DOCUMENTS

| | | |
|---|---|---|
| 3,718,431 A | 2/1973 | Wild |
| 3,859,672 A | 1/1975 | Modig |

(Continued)

FOREIGN PATENT DOCUMENTS

| | | |
|---|---|---|
| CN | 101053496 A | 10/2007 |
| JP | 08275907 A | 10/1996 |

(Continued)

OTHER PUBLICATIONS

International Search Report of PCT/US16/42931, Toilet Apparatus and Method of Use, dated Oct. 20, 2016, 136 pages (including translation of non-English references).

(Continued)

*Primary Examiner* — Lori L Baker
(74) *Attorney, Agent, or Firm* — Polsinelli PC

(57) ABSTRACT

A toilet apparatus has a waste material receiving bowl with an opening to receive an absorbent media and indicator and a sensor to detect a presence of the indicator in the material receiving bowl when the indicator is present in the material receiving bowl and transmit a signal indicating the indicator is present in the material receiving bowl. A control circuit receives the signal from the sensor, processes the signal to determine the indicator is present in the material receiving bowl, and causes one or more actions to be taken by the (Continued)

toilet apparatus based on determining the indicator is present in the material receiving bowl.

50 Claims, 11 Drawing Sheets

(51) Int. Cl.
*B01F 15/00* (2006.01)
*A47K 11/02* (2006.01)
*B01F 15/02* (2006.01)

(52) U.S. Cl.
CPC ............ *G05D 21/02* (2013.01); *Y02A 50/454* (2018.01); *Y02A 50/455* (2018.01)

(56) References Cited

U.S. PATENT DOCUMENTS

| | | | |
|---|---|---|---|
| 5,276,924 | A | 1/1994 | Hachioma |
| 5,307,524 | A | 5/1994 | Veal |
| 2,882,534 | A | 4/1995 | Jauch et al. |
| 6,391,453 | B1 | 5/2002 | Hansen et al. |
| 6,849,665 | B2 | 2/2005 | Frenz et al. |
| 8,973,774 | B1 | 3/2015 | Stravitz |
| 9,743,815 | B2 | 8/2017 | Hibbs |
| 2008/0082063 | A1 | 4/2008 | Ales et al. |
| 2010/0199413 | A1 | 8/2010 | Pollack et al. |
| 2010/0275363 | A1 | 11/2010 | Irizarry-Lugo |
| 2013/0185866 | A1 | 7/2013 | Cheung |
| 2016/0066895 | A1 | 3/2016 | Schwyn et al. |
| 2017/0354300 | A1 | 12/2017 | Hibbs |

FOREIGN PATENT DOCUMENTS

| | | |
|---|---|---|
| JP | 2007136154 A | 6/2007 |
| KR | 20150056708 A | 5/2015 |
| WO | WO2011155849 | 12/2011 |

OTHER PUBLICATIONS

Connelly—GMP Inc.'s Iron Sponge Wood chips (http://www.connellygpm.com/ironsponge.html), 2 pages, retrieved Jan. 18, 2018, but admitted prior art believed to exist prior to Jan. 15, 2017.

Sulfatreat (http://www.slb.com/services/production/production-technologies-chemicals-treatments/CURE-technologies/hydrogen-sufide-mercury-adsorbents/hydrogen-sulfide-removal-from-gas.aspx?entry=ad_google_mi_sulfatreat&gclid=EAlalQobChMl6qmg8_Dh2AIV2LXACh3NjwofEAAYASAAEgJ4LvD_BwE), 1 page, retrieved Jan. 18, 2018, but admitted prior art believed to exist prior to Jan. 15, 2017.

International Search Report and Written Opinion for PCT/US2018/013927, , Waste Absorbing Formulation With Communication Capabilities and Toilet Systems for Use Thereof, May 15, 2018, 7 pages.

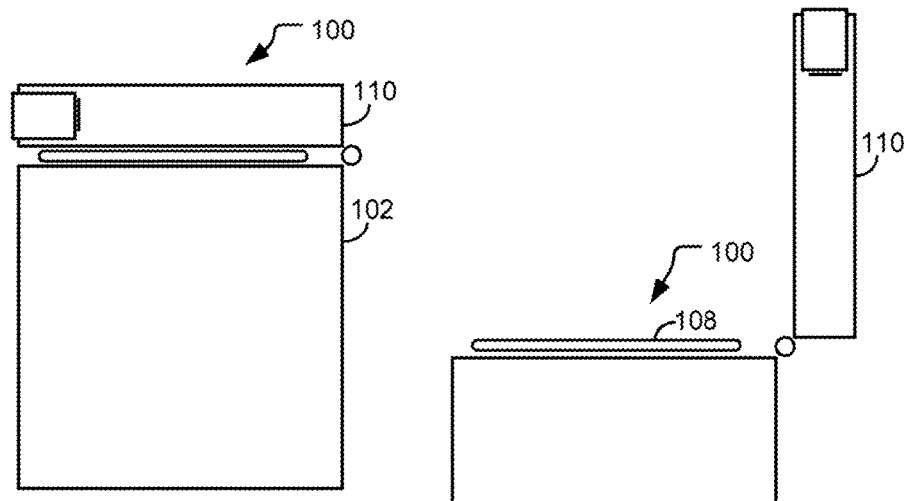
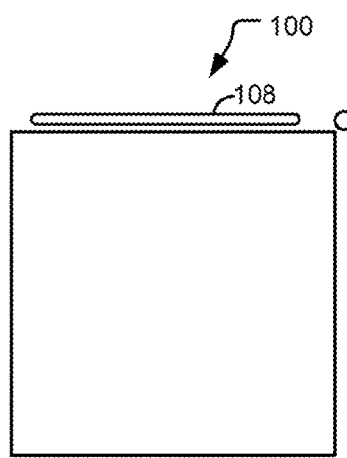
FIG. 1B
FIG. 2B
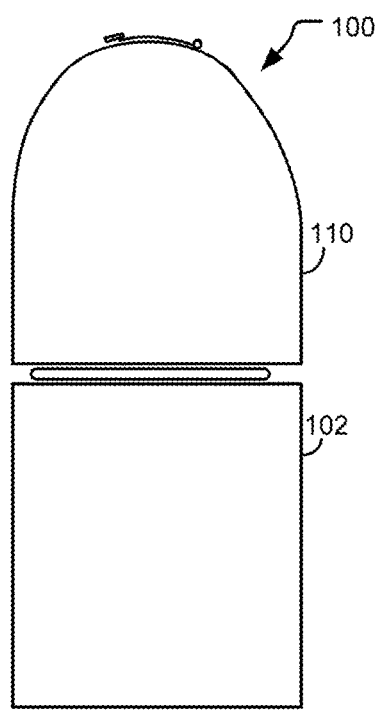
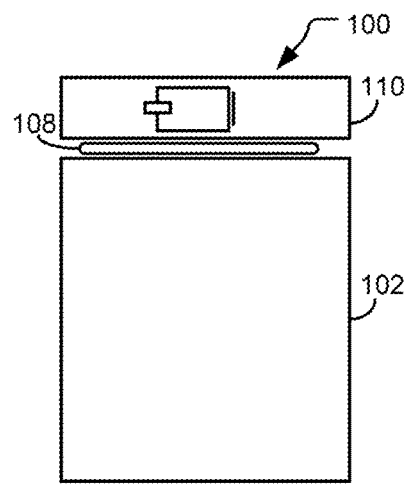
FIG. 2C
FIG. 1C

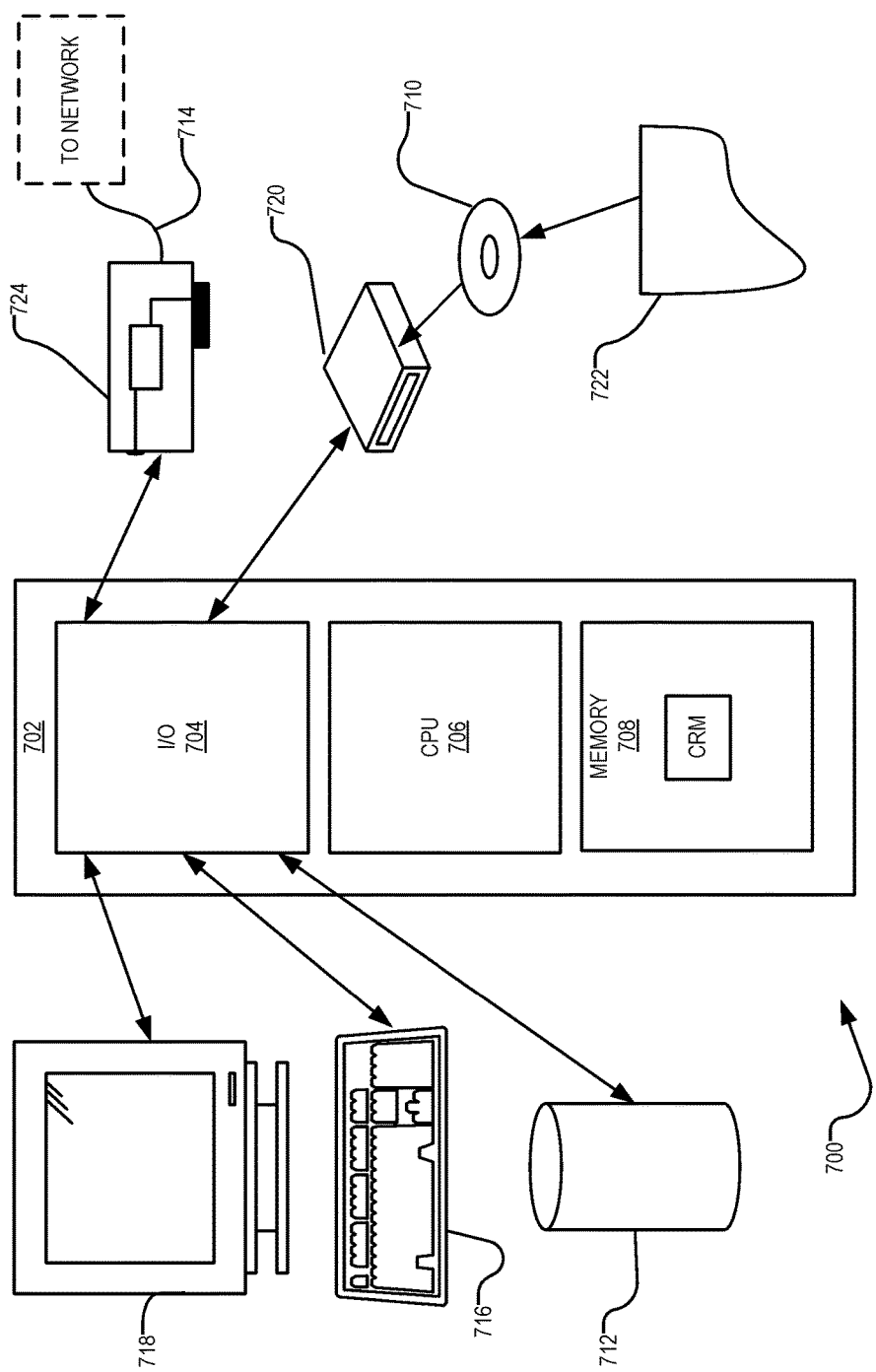

WASTE ABSORBING FORMULATION WITH COMMUNICATION CAPABILITIES AND TOILET SYSTEMS FOR USE THEREOF

RELATED APPLICATIONS

This application takes priority to U.S. Patent Application No. 62/447,192, filed Jan. 17, 2017, entitled Variable Density Waste Absorbing Formulation with Communication Capabilities Suited for Various Toilet Systems, the entire contents of which are incorporated herein by reference.

FEDERALLY SPONSORED RESEARCH OR DEVELOPMENT

Not Applicable.

COMPACT DISK APPENDIX

Not Applicable.

FIELD

The present disclosure generally relates to waste management devices, and more particularly, to a toilet apparatus, absorbent media with communication properties for the toilet apparatus, and methods of their use.

BACKGROUND

Toilets, which may also be referred to as commodes, generally refer to devices used for the disposal of human waste. Flush toilets are a common type of toilet that uses water to facilitate removal of the waste to a processing site, such as a septic system, for its decomposition. More recently, however, other toilet designs have been implemented that can, among other things, reduce water usage levels required for their operation. Examples of such toilets include composting toilets that process the waste locally, and chemical based toilets that use chemicals to deodorize the waste until it can be moved to another location for processing. Nevertheless, each of these toilet designs require special handling techniques to ensure the safe movement of waste to a sanitary location for the toilet's continued use.

Toilet systems have little regard for the medium used to contain, transport, or in some cases treat human waste. For example, a conventional water based toilet is typically connected to a potable water line that is pressurized to a sufficient level to transfer water into the water toilet to function. The toilet is dependent upon the installer and the fresh water treatment facility to supply water for it to function. In a conventional toilet with a receiving bowl and a holding tank, a float valve is utilized to ensure the water tank is adequately filled for ensuing use. The float valve in the tank would function the same way if a different liquid formulation were introduced into the tank.

A portable toilet closet found at outdoor events or construction sites, for example, utilize a blend of water and chemicals that are professionally prepared to ensure user and public safety. Modern formulations have replaced the widespread use of formaldehyde. These modern formulations may comprise bactericidals, organic compounds, fragrances, and dyes. The user assumes the solution is safe—both to their person and to the environment.

A more personal use composting toilet requires the manufacturer of the toilet to instruct the owner how to install and operate their toilet system. An important instruction is to properly vent a composting toilet outside the dwelling. Such ventilation is an attempt to minimize airborne particulate and odors inside the dwelling. The maker of the composting toilet may also instruct the owner of a recommended dry media that works best in their toilet. It is up to the owner and user of the composting toilet to maintain the safe and effective function of their composting toilet inside their dwelling.

SUMMARY

In one aspect, a toilet apparatus has a waste material receiving bowl with an opening to receive an absorbent media and indicator and a sensor to detect a presence of the indicator in the material receiving bowl when the indicator is present in the material receiving bowl and transmit a signal indicating the indicator is present in the material receiving bowl. A control circuit receives the signal from the sensor, processes the signal to determine the indicator is present in the material receiving bowl, and causes one or more actions to be taken by the toilet apparatus based on determining the indicator is present in the material receiving bowl.

In another aspect, a method for a toilet apparatus includes providing a waste material receiving bowl with an opening to receive an absorbent media and indicator and detecting, with a sensor, a presence of the indicator in the material receiving bowl when the indicator is present in the material receiving bowl and transmitting a signal indicating the indicator is present in the material receiving bowl. The method includes receiving the signal from the sensor at a control circuit, processing the signal at the control circuit to determine the indicator is present in the material receiving bowl, and transmitting a control signal from the control circuit to cause one or more actions to be taken by the toilet apparatus based on determining the indicator is present in the material receiving bowl.

In another aspect, a waste absorbing media for use in a toilet includes a fibrous absorbent material and an indicator that can be detected by a sensor of the toilet to indicate presence of the indicator in the toilet.

In another aspect, a waste absorbing media is for use in a dry composting toilet. The waste absorbing media comprises at least 50% by volume of a fibrous absorbent material and between 0.5% to 5.0% of an indicator component that is ferromagnetic and corrodible.

In another aspect, a method for producing a waste absorbing media with communication capabilities comprises providing a fibrous absorbent material, heating the fibrous absorbent material, contacting the heated fibrous absorbent material with a liquid solution, and adding an indicator that is ferromagnetic and corrodible, wherein the indicator can be detected by a sensor of a toilet to indicate presence of the indicator in the toilet.

BRIEF DESCRIPTION OF THE DRAWINGS

FIGS. 1A, 1B, and 1C are perspective, side, and front views, respectively, illustrating an example toilet apparatus with its lid in the closed position according to the teachings of the present disclosure.

FIGS. 2A, 2B, and 2C are perspective, side, and front views, respectively, illustrating an example toilet apparatus with its lid in the open position according to the teachings of the present disclosure.

FIG. 7 illustrates a block diagram of an example computer device for use with the example embodiments.

DETAILED DESCRIPTION

Figures 1A, 2A:
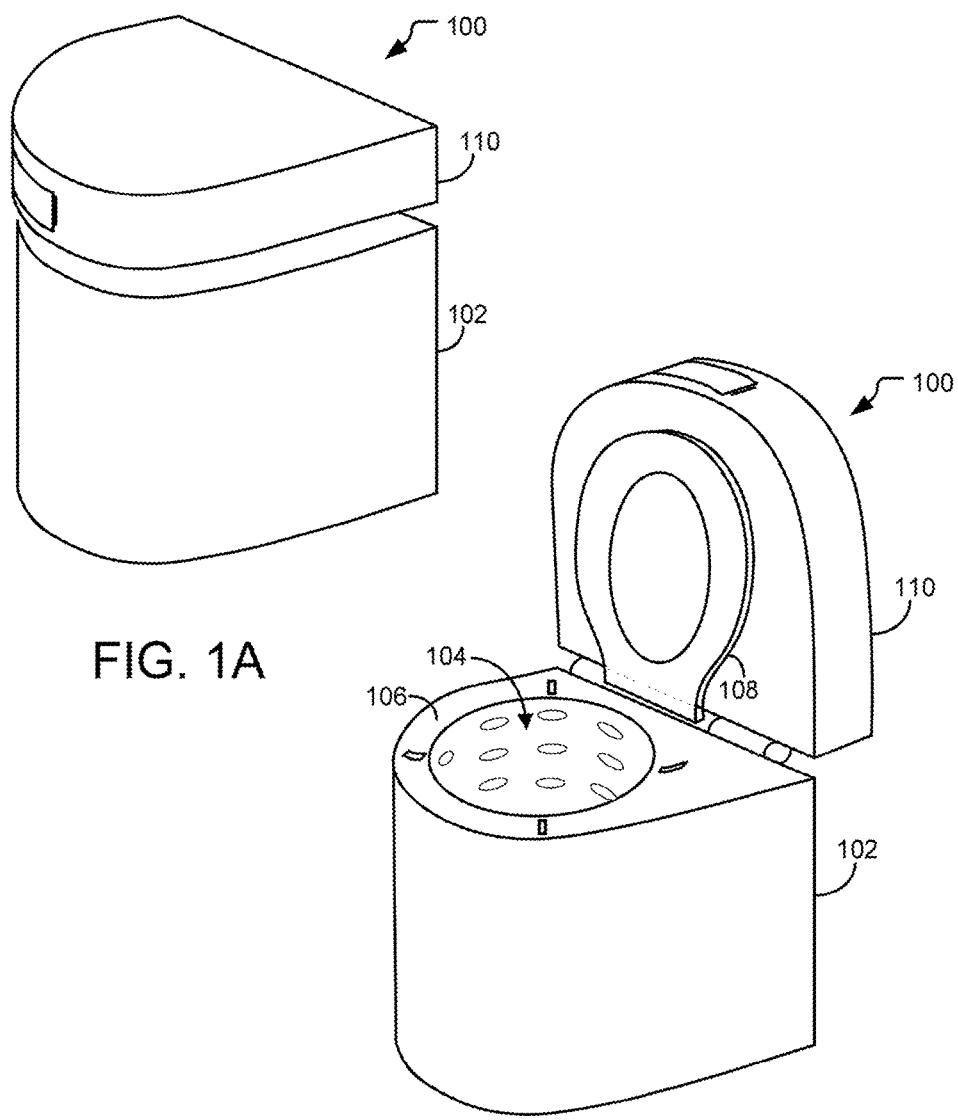

Current toilet designs have often required special handling techniques for the safe and sanitary removal of waste. Nevertheless, currently implemented solutions for this problem have required the use of one or more additional materials that could potentially be harmful to the environment. For example, flush toilets often require the use of relatively large amounts of water, which has been recognized as a valuable commodity, particularly in locations where water has become a scarce resource. Chemical toilets use less water than their flush toilet counterparts, but require the use of chemicals that typically hinders the efficient decomposition of the waste, even after the waste is removed from the toilet. Additionally, composting toilets may use one or more types of microbes to decompose the waste in place. Yet the composting process provided by these microbes can often generate unpleasant odors that may require additional mechanisms, such as ventilation systems, thus limiting the locations at which these composting toilets may be used.

Embodiments of the present disclosure provide a solution to these problems, among other problems, using a toilet apparatus and method that keeps waste material separated from the components of the toilet apparatus, and using agitation such as mechanical vibration to enhance mixing of the waste material with an absorbent media as it is introduced into the toilet such that odors normally associated with the waste material are minimized as well as providing enhanced sterilization by dehydrating the waste material immediately upon entry of the waste material into the toilet.

Embodiments of the present disclosure include using an indicator sensor in the toilet apparatus in combination with an adsorbent media provided with an indicator or other communication media that can be sensed by the indicator sensor. Different types of indicator sensors and communication media may be used in such a toilet system to detect the presence (or lack thereof) of the absorbent media in the toilet system and, in some embodiments, one or more amounts of the absorbent media. In one example, the indicator sensor is a proximity sensor that can detect a presence of the indicator (or lack thereof) and/or an amount of indicator within a proximity of the indicator sensor but does not require the indicator to contact the proximity sensor for the detection. One or more indicator sensors each send one or more control signals to a control circuit of the toilet. Each control signal contains a value of, or other data identifying, a detected level or other measurement taken by the indicator sensor. One or more of the values or other data in each control signal indicate the presence or lack of presence of the indicator and optionally an amount of indicator when the indicator is present.

The control circuit processes the one or more control signals to determine, based on the values or other data in the control signals, whether an indicator is present or not present in a detection zone or other portion of the toilet and optionally determines an amount of the indicator present. The control circuit determines one or more actions to take, or causes one or more actions to be taken by the toilet apparatus, based on the determination the indicator is present or is not present in the detection zone or other portion of the toilet and optionally based on an amount of indicator determined to be present in the detection zone or other portion of the toilet.

The toilet apparatus and methods disclosed herein use an absorbent media that is received in a receiving bowl, bag, or other container of the toilet. The absorbent media absorbs moisture from the waste material and, with agitation, at least substantially covers the waste material. The absorbent media may include any suitable type of material that absorbs moisture and at least substantially covers the waste with agitation or the import of vibrational energy. Examples of absorbent media include a granular material, such as sand, pumice, pet litter, zeolite, clay, sepiolite, wood, paper, crushed cellulose, etc. In one embodiment, the absorbent media is an absorbing fiber, such as wood or cellulose fibers, which may take one or more forms, including a pellet form, chip form, and/or ground/dust form.

The absorbent media includes or is provided with (together or separately) an indicator component or compound that can be detected by an indicator sensor of the toilet apparatus. The indicator is a component or compound that, when detected by an indicator sensor, indicates the presence or lack of presence of absorbent media in a waste material receiving bowl, bag, or other waste material receiving container of the toilet apparatus. In some embodiments, the indicator, when detected by the indicator sensor, also indicates an amount of the indicator that is present. Thus, the indicator communicates its presence, and optionally its status, to the indicator sensor. That presence and optional status is, in turn, communicated to a control circuit of the toilet apparatus.

In one embodiment, the indicator may be, for example, a ferrous material, such as iron particles or another powder, particle, or grain with ferromagnetic properties. A ferromagnetic property of the indicator allows detection of the indicator, for example, through the use of an inductive, capacitive, or magnet detecting proximity indicator sensor. In another embodiment, the indicator is a nonferrous metal, such as aluminum or copper, that can be detected, for example, by an inductive or capacitance detecting indicator sensor or other indicator sensor. In another embodiment, the indicator is an alloy that can be detected, for example, by an inductive or capacitance detecting indicator sensor or other indicator sensor. In another embodiment, the indicator is a biologic that can be detected by a biologic detecting indicator sensor. In another embodiment, the indicator is a paramagnetic or diamagnetic compound.

In some embodiments, the indicator has one or more properties or characteristics that react with environmental conditions of the waste material and time of exposure. The characteristic may be, for example, a corrosive characteristic that causes the indicator to corrode, a dissolving characteristic that causes the indicator to dissolve, a decay characteristic that causes the indicator to decay, a rusting characteristic that causes the indicator to rust, a characteristic that causes the indicator to be reduced or eliminated from exposure to ultraviolet light, or another characteristic that causes the indicator to be reduced or eliminated immediately or over time, including based on a selected action by the toilet apparatus.

In one example, the indicator has a corrosive characteristic. The corrosive characteristic can be used with a toilet system equipped with an indicator sensor to detect the presence or lack of presence, and optionally remaining useful life, of the absorbent media or other toilet waste treatment by detecting the corrosion status of the indicator and thereby determine a state of use of the absorbent media. When the indicator with a corrosive characteristic is exposed to urine or other liquid, for example, the indicator will corrode, decay, or otherwise dissolve over a period of time. By determining a current state of corrosion, decay, or dissolve of the indicator (e.g. through use of an indicator sensor in the toilet system to sense an inductance, capacitance, or magnetic field of or impacted by the indicator) and comparing that sensed state to a known state in which the indicator is not corroded, decayed, or dissolved, a control circuit of the toilet system can determine how much of the indicator is present or remains and thereby determine a remaining useful life of the absorbent media by using the portion of present or remaining indicator as corresponding to a portion of present or remaining useful life of the absorbent media.

When used with an agitating, waterless toilet in one example, the indicator sifts through some or all of the absorbent media in the bag or other container to the bottom or a bottom portion of the absorbent media in the bag or other container. In this example, the bottom or bottom portion of the bag or other container may include some lighter and less dense absorbing particles, at or below which the indicator may sift and/or collect. This process may be encouraged by agitation, gravity, and optionally magnetic forces.

In one embodiment, the indicator is present between one tenth of one percent and ten percent of the total volume of the absorbent media. For example, a package containing 100 ml of absorbent media may have an amount of indicator that is 1 percent (1 ml) of the total volume of the absorbent media. In another example, between 0.01 grams to 30 grams of indicator is included in a package containing 100 ml of absorbent media. The quantity of indicator to be provided with the absorbent material optionally may be selected based, at least in part, on a detection level or detection zone of an indicator sensor in the target toilet system.

In another embodiment, a treatment is provided with or to the absorbent media. Such treatments include a bactericide, waste treatment, malodor treatment, enzymatic solution, or any combination of the foregoing.

Toilet System

FIGS. 1A through 2C illustrate an example toilet 100 according to one embodiment of the present disclosure. In particular, FIGS. 1A and 2A show perspective views of the toilet 100, FIGS. 1B and 2B show side views of the toilet 100, and FIGS. 1C and 2C show front views of the toilet 100. The toilet 100 includes a housing 102 for housing a waste material receiving bowl 104, and a top member 106 with an opening defining an annular seating surface. In one embodiment, the annular seating surface may include a seat 108 that is configured between the top member 106 and a lid 110. The toilet 100 also includes a lid 110. The seat 108 and the lid 110 are hingedly affixed to the housing 102. The lid 110 and seat 108 are movable from a closed position (FIGS. 1A, 1B, and 1C) adjacent to the top member 106 to an open position away from the top member 106 (FIGS. 2A, 2B, and 2C). Although FIGS. 1A through 2C show several features of the toilet 100, the toilet 100 may include additional, fewer, or different features than those described herein without departing from the spirit or scope of the present disclosure.

Figure 3A:
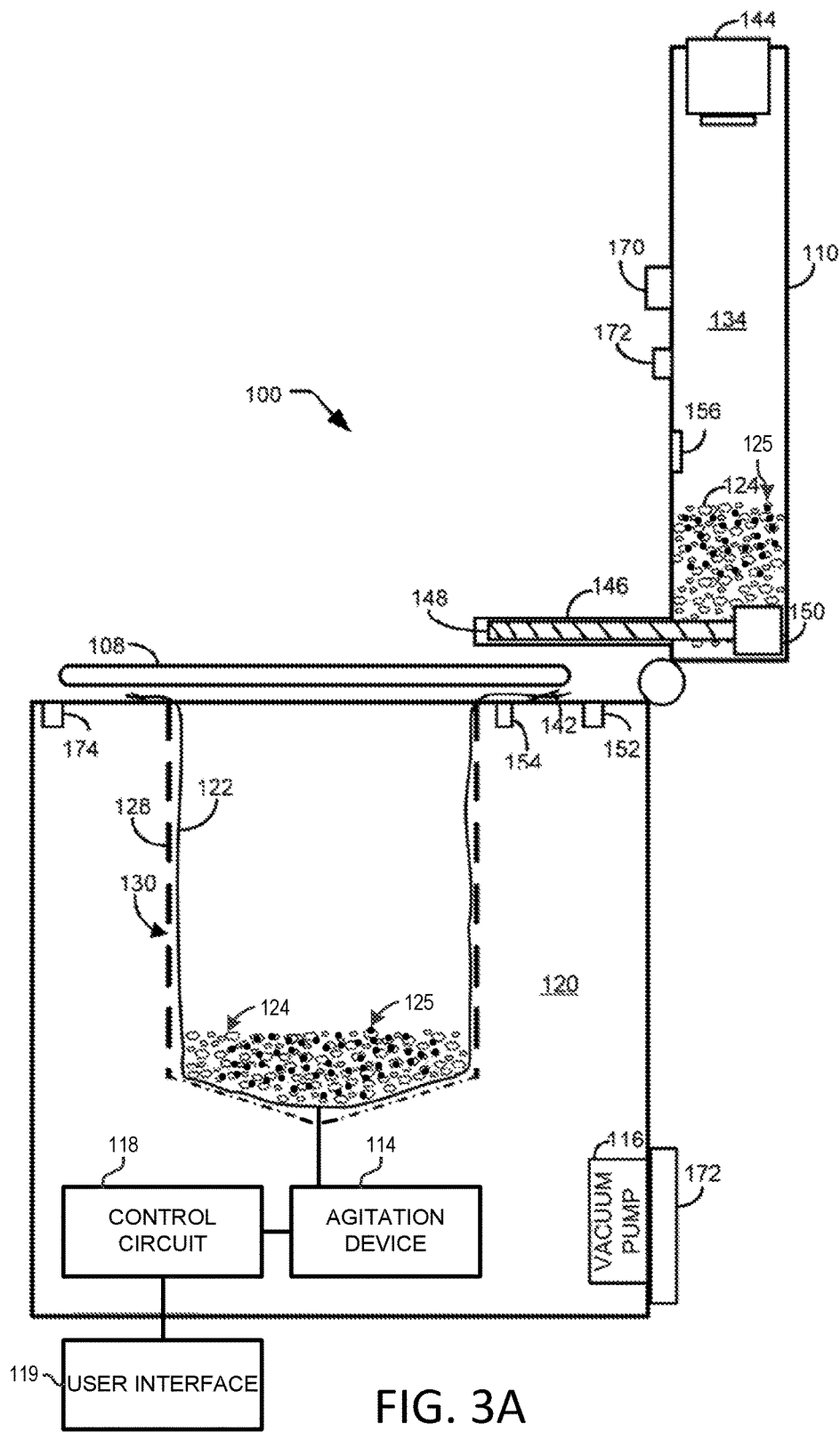
FIGS. 3A-3C illustrate cut-away views showing several features of the example toilet according to one embodiment of the present disclosure.

FIG. 3A illustrates a cut-away view showing several features of the example toilet 100 according to one embodiment of the present disclosure. In general, the space between the housing 102 and the bowl 104 forms a chamber 120 for housing several components of the toilet 100, such as a vibrating mechanism or other agitation device 114, a vacuum pump 116, and a control circuit 118 that controls the operation of the toilet 100, including the agitation device 114 and/or the vacuum pump 116.

The agitation device 114 is, in one example, an agitation device to agitate the absorbent media and the waste material to cause the absorbent media to at least substantially cover the waste material while the agitation device is not contacting the absorbent media and the waste material. In one example, the agitation device agitates the absorbent media and the waste material at a lower portion of the bag to cause the absorbent media to at least substantially cover the waste material while the agitation device is not contacting the absorbent media and the waste material. The agitation device 114 further includes any mechanism that generates vibrational energy that is imparted into an absorbent media 124 and indicator 125.

The control circuit 118 controls the operation of the one or more electrical components of the toilet 100. The control circuit 118 receives one or more inputs from an optional user interface 119, such as from an on/off switch or button. The control circuit 118 also receives one or more control signals from one or more sensors each having a status, activity, state, detection level, or other information and processes the one or more control signals to determine the one or more detected statuses, activities, states, detected level, or other information. The control circuit 118 operates one or more electrical components of the toilet 100 in response to the one or more user interface inputs and/or one or more control signals. For example, the control circuit may turn on the agitation device 114 or pump 116 or cause absorbent media and/or indicator to be dispensed in response to the one or more user interface inputs and/or one or more control signals.

The control circuit 118 may alert the user for one or more states or actions (e.g. sensor states or other states or conditions determined by the control circuit) by means of an audible signal, a visual signal, a tactile signal, or any combination of audible, visual, and tactile signals. For example, if the control circuit 118 determines the indicator is not present, the control circuit may transmit a signal to an audio, visual, tactile, and/or haptic device (see user interface 119) of the toilet 100 to cause the audio, visual, tactile, and/or haptic device of the toilet to emit or otherwise generate an audio, visual, tactile, and/or haptic alert or other response, as the case may be, to alert the user the toilet will not function and/or alert the user of any incompatible substance within the toilet could pose personal or environmental risks or hazards.

The optional user interface 119 includes one or more switches and/or buttons, such as from an on/off switch or button. The user interface 119 optionally includes one or more audio, visual, tactile, and/or haptic devices to emit or otherwise generate an audio, visual, tactile, and/or haptic alert or other response, respectively. The user interface 119 further may include a display or touch screen to display data, signals, alerts, images, video, and other information received from, or in response to one or more signals from, the control circuit 119. The user interface 119 further may include one or more input devices to receive one or more inputs, including data, from a user and one or more output devices to display or otherwise provide one or more outputs to the user. The user interface 119 further may include an audio, visual, tactile, and/or haptic device that can receive a control signal from the control circuit 118 and, in response to the control signal from the control circuit, emit or otherwise generate an audio, visual, tactile, and/or haptic alert or other response, as the case may be. For example, an audio, visual, tactile, and/or haptic device can receive a control signal from the control circuit 118 and, in response to the control signal from the control circuit, emit or otherwise generate an audio, visual, tactile, and/or haptic alert or other response, as the case may be, to alert the user the toilet will not function, alert the user of any incompatible substance within the toilet that could pose personal or environmental risks or hazards, or otherwise alert the user to a state of the toilet 100.

The absorbent media 124 may include any suitable type of material that mixes with the waste, particularly under the influence of vibrational energy or other agitation. In one embodiment, the absorbent media is a granular material, such as sand, pumice, pet litter, zeolite, clay, sepiolite, wood, paper, crushed cellulose, etc. In another embodiment, the absorbent media is an absorbing fiber, such as wood or cellulose fibers, which may take one or more forms, including a pellet form, chip form, and/or ground/dust form. Embodiments of the absorbent media 124 may serve as a desiccant to aid in sterilization by effectively drawing moisture away from the waste material, thus reducing sanitary hazards typically encountered with organic waste as well as minimizing odors generated by the waste material.

The toilet 100 can be configured with a disposable bag 122 that is releasably secured in the bowl 104 and configured to receive and hold a specified amount of absorbent media 124 and indicator 125. In general, the disposable bag 122 can be releasably secured inside the bowl 104 and partially filled with an absorbent media 124 and indicator 125 such that when used, agitation may be imparted to the absorbent media 124 and indicator 125 for mixing with any waste introduced into the disposable bag 122 while keeping the components of the toilet, such as the vibrating mechanism or other agitation device 114, separated from communication with (i.e., not touching) the waste material and absorbent media in the disposable bag 122. Following the introduction of waste, the disposable bag 122 may be removed from the bowl 104 and disposed of and another disposable bag 122 releasably secured to the bowl 104 for ensuing uses of the toilet 100.

Certain embodiments of the toilet 100 may provide advantages not heretofore recognized by traditional toilet designs. For example, embodiments of the toilet 100 may reduce or eliminate the extraneous use of certain materials required by traditional toilet designs, such as water, chemical treatment, biological decomposing materials, and the like. Additionally, the disposable bag 122 provides a temporary chamber for receiving waste and disposing of the waste in a safe, sanitary manner, while the absorbent media provides for at least partial encapsulation of the waste such that any odors generated by the waste are minimized. Additionally, because little or no water is required for its operation, the toilet 100 may be used in locations where a source of water or means to manage the processing and removal of waste may not be readily available, such as in a portable, remote environment (e.g., during a long road trip, a camping excursion, etc.).

The bowl 104 and the housing 102 form an enclosed chamber 120 that optionally is sealed from the outside environment. When the vacuum pump 116 is turned on, it generates a vacuum (e.g., negative) pressure inside the chamber 120. In one embodiment, the vacuum pump 116 includes one or more fans that, when powered on, blow air from the chamber 120 to the ambient environment. Additionally, a certain quantity of holes optionally may be left uncovered by the bag 122 so that an airflow may be generated from the bowl 104 into the chamber 120 for minimizing odors generated during the use of the toilet 100. Nevertheless, the vacuum pump 116 may include any device that creates a vacuum condition inside the chamber 120 when powered on, such as a piston-driven pump having check valves at its entry and exit ports. Additionally, the vacuum pump 116 may be omitted if a vacuum condition is not needed or desired for the operation of the toilet 100.

The bowl 104 may be made of any suitable material (e.g., sheet metal, plastic, fiberglass, etc.) and have any desired shape to receive and temporarily hold the disposable bag 122 against its surface. In one embodiment, the bowl 104 includes a side member 128 formed of sheet metal into a cylindrical shape and has holes 130 configured along its extent, such that, when the vacuum pump 116 is powered on, the disposable bag 122 is urged against the surface of the side member 128. Also, the bowl 104 optionally includes a bottom member 132 that is formed of an air permeable material (e.g., screen, fabric, etc.) that allows the vacuum pressure generated in the chamber 120 to urge the disposable bag 122 against the bottom member 132. In one embodiment, the bottom member 132 is resilient or stretchable to allow vibrational energy generated by the agitation device 114 to be transferred to the absorbent media 124 and indicator 125 for causing movement or agitation of the absorbent media and indicator for enhanced mixing with any waste introduced into the disposable bag 122.

In one embodiment, the frequency (e.g., vibrational speed of the vibrating mechanism) and/or amplitude (e.g., cyclical distance traveled by the bottom member 132) of the vibrational energy imparted by the agitation device 114 to the absorbent media and waste material may be selected according to the size and density of the absorbent media 124. In this manner, a specified level and frequency of vibrational energy may be produced that optimally excites the absorbent media 124 according to its size, weight, and/or resiliency (e.g., bounciness). For example, when a particular type of absorbent media 124 having a specified size, weight, and/or resiliency is selected, the frequency and/or amplitude of the agitation device 114 may be altered for optimal movement of the absorbent media 124 in the bag 122. The amplitude and/or frequency of the vibrational energy may be altered in any suitable manner.

In one embodiment, the bottom member 132 of the bowl 104 has a conical shape, or other suitable shape, to urge the absorbent media and waste material toward the center of the bowl under the force of gravity. For example, the conical shape may be provided by a static tension force exerted on the bottom member 132 by the line 140. Nevertheless, the conical shape may be provided using any suitable technique. For example, the bottom member 132 may be formed from a sheet of material (e.g., sheet metal) that is resilient in consistency (e.g., spring-like) and formed into a conical shape and perforated to allow airflow there through. In another example, the bottom member 132 may be formed from a flexible screen or material.

Figure 3B:
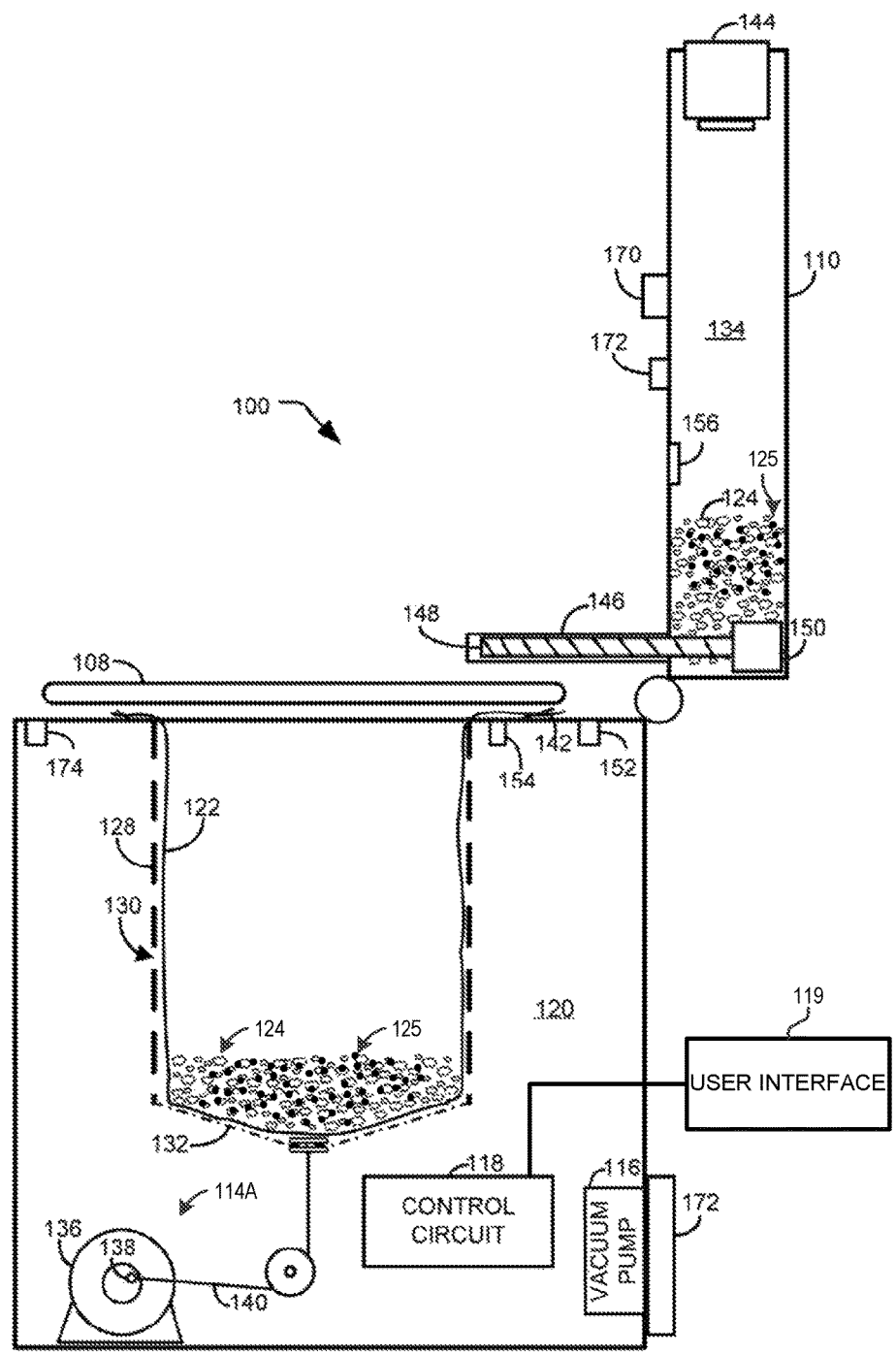

FIG. 3B depicts one example of a agitation device 114A that forms an agitation device for agitating the absorbent media 124 and indicator 125 disposed in the disposable bag 122. In one embodiment, the agitation device 114A includes a motor 136 with an eccentrically mounted pin 138 that is coupled to the bottom member 132 via a line 140 (e.g., rope, twine, strap, cable, etc.) such that rotation of the motor 136 causes the vibrational energy to be imparted in a generally vertical direction (e.g., up and down) on the bottom member 132. Nevertheless, other embodiments contemplate that the agitation device 114 may include any mechanism that generates vibrational energy that is imparted into the absorbent media 124 and indicator 125. For example, the agitation device 114 may be a motor having an eccentrically mounted weight on its shaft, which is physically coupled to the bottom member 132. Certain embodiments of the toilet 100 that use vertical excitation of the absorbent media 124 and indicator 125 may be advantageous in that vibrational excitation of the absorbent media and indicator may be maximized relative to the overall vibration incurred by the toilet 100 during its use.

In the example of FIG. 3B, the motor 136 may be a variable speed motor whose speed may be altered to change the frequency of the vibrational energy imparted by the agitation device 114A to the absorbent media and waste material while the amplitude of the vibrational energy may be altered by adjusting the angular distance of the pin 138 from the axis of the shaft. For example, the control circuit 118 may generate a display for a user interface 512 (FIG. 5) for receiving user input associated with a specified frequency and/or amplitude to be used according to a type of absorbent media 124 placed in the bag 122. Alternatively, the control circuit 118 may have one or more switches that enable a user to select one or more frequencies and/or one or more amplitudes with, or without, a displayed user-interface.

Referring now to FIGS. 3A-3B, in one embodiment, the lid 110 includes a hopper 134 for storing the absorbent media 124 and indicator 125. A latch door 144 or other selectively closable mechanism, is provided to allow entry of the absorbent media 124 and indicator 125 into the hopper 134, and a dispenser 146 is provided for transferring a specified amount of absorbent media 124 and indicator 125 from the hopper 134 (or different portions/containers of the hopper) into the disposable bag 122 each time the toilet 100 is used. In other embodiments, the toilet 100 may include a hopper placed at other locations, such as behind the toilet, beside the toilet, or underneath the toilet.

In one embodiment, the dispenser 146 includes an auger assembly having one or more augers 148 configured in the dispenser 146 that is/are in communication with the inside of the lid 110. Each auger is rotationally coupled to a motor, such that when the motor is turned on, a specified amount of absorbent media 124 and/or indicator may be dispensed into the disposable bag 122. For example, a motor 150 dispenses the absorbent media 124, such that when the motor is turned on, a specified amount of absorbent media 124 is dispensed into the disposable bag 122. Another motor (not shown) operates another auger for the indicator in one embodiment, such that when the motor is turned on, a specified amount of indicator is dispensed into the disposable bag 122. In one embodiment, the dispenser 146 may be hingedly affixed to the lid 110 such that it may be rotated to allow for closure of the lid 110.

In one embodiment, the auger 148 may optionally have a sawtooth shape or other suitable shape for grinding, chipping, shredding, pulverizing (e.g., breaking apart) a concentrated amount of absorbent media 124 provided in block form (e.g., a brick) into an expanded matrix for use in the toilet 100. Certain embodiments employing absorbent media 124 provided as relatively small concentrated blocks may provide certain advantages, such as a relatively smaller volume required for their storage prior to use as well as their relative ease of use compared to absorbent media 124 provided in expanded granular form. Although non-block forms of absorbent media may be used in other embodiments.

In another embodiment, the dispenser 146 may include a media retention mechanism to inhibit or reduce unwanted absorbent media 124 when not needed or desired, such as when the toilet 100 is not in use. For example, the exit or end of the dispenser may include a spring-loaded valve that is biased in a closed position when absorbent media 124 is not being actively discharged from the auger 148. As another example, the motor 150 driving the auger 148 may be rotated in a backwards direction for a specified period of time following dispensing of the absorbent media 124 such that any absorbent media 124 still within the dispenser 146 may be driven back into the hopper 134.

In another embodiment, the toilet 100 includes one hopper or other container and corresponding dispenser for the absorbent media and another hopper or other container and corresponding dispenser for the indicator. Each hopper may include an auger or other dispensing mechanism to dispense the absorbent media and indicator, respectively, into the disposable bag 122 or other container. In another embodiment, the indicator is impregnated on or attached to the absorbent media, and a single hopper or other container and corresponding dispenser are used.

The toilet 100 may further include one or more other dispensers to dispense other components. For example, a separate treatment optionally may be dispensed with the absorbent media, e.g. a bactericide, waste treatment, malodor treatment, enzymatic solution, or any combination of the foregoing. In one example, a liquid container and liquid dispenser would be included for a liquid or solution, and a liquid dispenser would emit or otherwise dispense the liquid or solution on or with the absorbent media. In another example, a malodor treatment is provided as particles in a separate container, which are dispensed by a dispenser. Of course, the treatment may be provided to or applied to the absorbent media prior to the absorbent media being placed in a hopper, in which case the treated absorbent media would be dispensed as discussed above.

In an alternate embodiment, the absorbent media and indicator are packaged in a single use bag, pouch, or other package. In this embodiment, the dispenser 146 is not needed and may not be present. Prior to using the toilet 100, the user opens the bag, pouch, or other package and deposits the contents of the bag, pouch, or other package into the disposable bag 122 of the toilet. Additional material may be deposited into the toilet 100 before and/or after toilet use to absorb or otherwise treat waste or prepare the toilet for ensuing uses.

The disposable bag 122 is sized to fit within the bowl 104, and be made of any suitable material (e.g., plastic, paper, etc.) that receives and holds absorbent media 124 and waste. In one embodiment, the disposable bag 122 is made of a material that can decompose when processed using standard waste treatment techniques. The bag 122 includes an upper edge that may be releasably secured to the top member 106 of the toilet 100 using a suitable releasable securement mechanism. In one embodiment, the releasable securement mechanism includes one or more tabs 142 configured on the top member 106 of the toilet 100 on which the top edge of the bag 122 may be impaled for holding the bag 122 in place.

Other embodiments contemplate that other types of releasable securement mechanisms may be used. For example, the releasable securement mechanism may include a hook-and-loop (e.g., Velcro) strips molded into the top edge of the disposable bag 122 and on the top member 106 of the toilet 100. For another example, the releasable securement mechanism may include a bag 122 with a drawstring or elastic member extending around the periphery of its edge for releasable securement to the top member 106. For yet another example, the releasable securement mechanism may include spring-loaded clips, or other mechanisms, that do not impale the disposable bag 122.

The toilet 100 may also include one or more sensors that may be used by the control circuit 118 to control its operation. Each of the sensors detect one or more statuses, activities, states, levels, or other information and communicate information to the control circuit 118 in one or more control signals for the one or more detected statuses, activities, states, detected level, or other information. For example, a lid position sensor 152 may be provided that senses when the lid 110 is moved from the closed to the open position. A bag presence sensor 154 may be provided that senses when a bag 122 is disposed within the bowl. Also, an absorbent media level sensor 156 may be provided to sense the level of absorbent media 124 stored in the hopper 134. Also, an occupant sensor 174 may be provided to sense when a user is occupying the toilet 100. Each of the sensors 152, 154, 156, 172, or 174 transmits one or more control signals to the control circuit 118 with their statuses, activities, states (e.g. 0 or 1, on or off, item detected/not detected, etc.), detected level, or other information. Any suitable types of sensors may be implemented with the sensors 152, 154, 156, 172, or 174. For example, the lid position sensor 152 may be a door switch, the bag presence sensor 154 may be an optical sensor that detects differing levels of light when covered by the bag 122, the absorbent media sensor 156 may be a capacitive device that changes its capacitance level when in contact with the absorbent media 124, and the occupant sensor 174 may be a temperature sensor that senses the typical surface temperature of a human body.

In one embodiment, an ultraviolet lamp 170 and a humidity sensor 172 (e.g., hygrometer) may be included on the lower surface of the lid 110. The control circuit 118 may function in response to signals obtained from the humidity sensor 172 to control operation of the ultraviolet lamp 170 for various purposes, such as disinfection of bacteria or other pathogens from the toilet 100 when not in use, or for a nightlight when used at night. For example, the control circuit 118 may, using the humidity sensor 172, sense when a moisture level in the toilet 100 has exceeded a specified threshold to activate the ultraviolet lamp 170.

Although FIGS. 3A-3B illustrate several example features of the toilet 100, it is contemplated that other embodiments of the toilet 100 may have more, different, or fewer features than those described herein. For example, the toilet 100 may include a lid 110 without a hopper 134 and/or dispenser 146 if manual entry of the absorbent media 124 into the disposable bag 122 is desired. A different type of dispensing mechanism may be used in place of auger to dispense absorbent media into the disposable bag or other container. In another example, the toilet 100 may be provided without a seat 108 if not needed or desired. For yet another example, the toilet 100 may include a different type of agitation device than the vibrating mechanism for agitating the absorbent media 124, such as a solenoid physically coupled to the bottom member 132 or one that will be described in detail below with reference to FIG. 4.

Figure 3C:
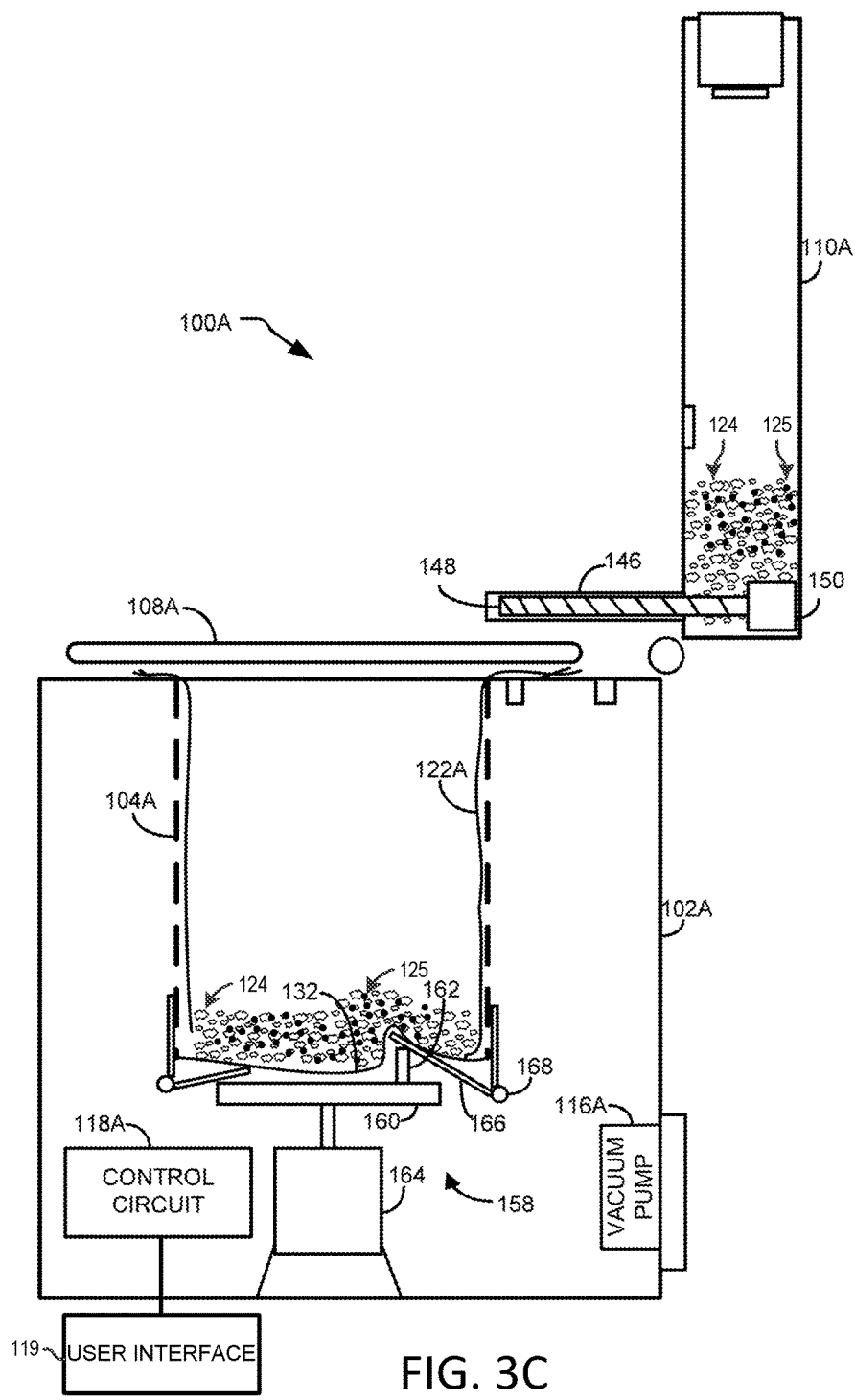

FIG. 3C illustrates another absorbent media agitation device that may be implemented with the toilet 100 according to another embodiment of the present disclosure. As shown, the toilet 100A includes a housing 102A, a bowl 104A, a lid 110A, a seat 108A, a vacuum pump 116A, a control circuit 118A, and a disposable bag 122A that are similar in design and construction to the housing 102, the bowl 104, the seat 108, the lid 110, the vacuum pump 116, the control circuit 118, and the bag 122 of FIG. 3. The toilet 100A of FIG. 4 differs, however, in that it includes an absorbent media agitation device 158 formed from a disk 160 with an eccentrically mounted cam 162, that is rotated by a motor 164. The absorbent media agitation device also includes multiple levers 166 (e.g., four levers) that are equally or unequally spaced apart, and hingedly affixed along the periphery of the bowl 104 via hinges 168. As the motor spins the cam 162, it interacts with multiple spaced-apart levers 166 to alternatively lift each lever 166 such that successive regions of the bottom member 132 are lifted for agitating the absorbent media 124. Additionally, the bag 122A separates the absorbent media and waste from the components of the toilet 100A so the waste material and absorbent media do not contact (i.e., come into communication) with the agitation device.

Figure 4:
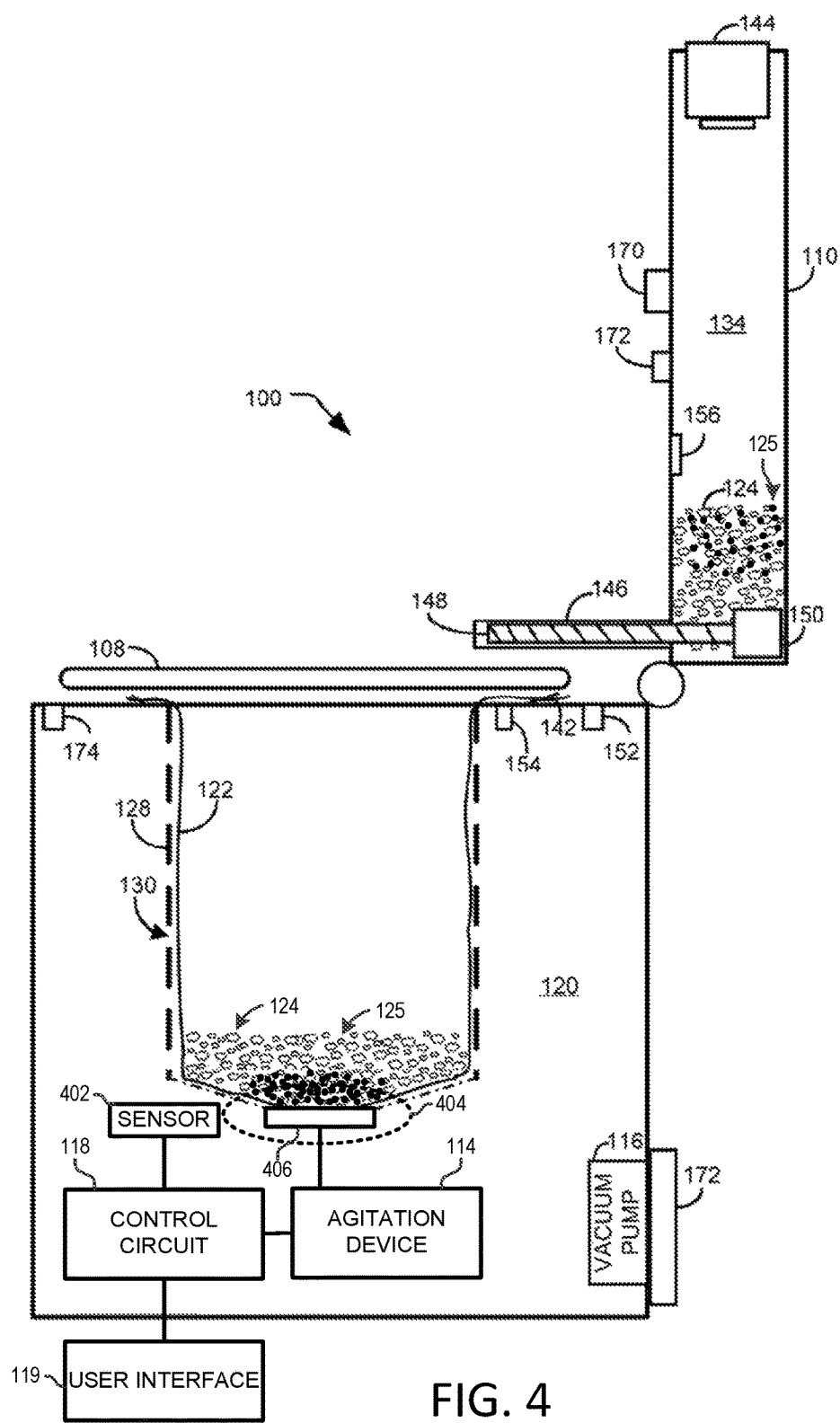
FIG. 4 illustrates a cut-away view showing several other features of the example toilet according to one embodiment of the present disclosure.

The media agitation device as shown in FIG. 4 may provide certain advantages for use with the toilet 100A. For example, the levers 166 may provide for enhanced vertical movement of the absorbent media at relatively lower frequencies than what may be provided by a vibrating device, such as that described above with respect to FIG. 3. Such agitation may be particularly beneficial when used with absorbent media that is relatively soft in consistency and low in density, such as loose fill cellulose typically used for insulating homes or other climatized structures.

FIG. 4 illustrates an example of an indicator sensor to sense the presence or the lack of a presence of the indicator and/or an amount of indicator. The toilet 100 includes one or more indicator sensors 402 that each detect a presence of the indicator (or the lack of a presence of the indicator) and/or an amount of indicator. In one example, each indicator sensor 402 detects a presence of the indicator (or the lack of a presence of the indicator) and/or an amount of indicator within a detection zone 404. In another example, one or more indicator sensors 402 are a proximity sensor that detects a presence of the indicator and/or an amount of indicator within a proximity of the indicator sensor, such as in a detection zone 404, but does not require the indicator to contact the proximity sensor for the detection. In another example, the indicator sensor 402 detects an environmental characteristic of the indicator that causes the indicator to be reduced or eliminated immediately or over time, including based on a selected action by the toilet apparatus, such as corrosion, dissolving, decay, rusting, or another characteristic that causes the indicator to be reduced or eliminated immediately or over time, including based on a selected action by the toilet apparatus.

Each indicator sensor 402 transmits one or more control signals to the control circuit 118. Each control signal contains a value of, or other data identifying, a detected level or other measurement taken by the indicator sensor. One or more of the values or other data in each control signal identify the presence or lack of presence of the indicator and optionally an amount of indicator when the indicator is present. For example, a value or other data in a control signal may be a digital or analog 1 or 0 (on or off) indicating the presence or lack of presence of the indicator. In another example, the value or other data in a control signal may be a value or level that from many possible values or levels that each correspond to a distinct sensor reading and that would each correspond to a different amount of detected indicator.

One or more indicator sensors 402 are placed at a lower and/or outer portion of the material receiving bowl 104 in one embodiment. However, one or more indicator sensors 402 also may be placed in relation to other portions of the toilet receiving bowl 104 or housing 102, including a mid-portion of the material receiving bowl 104 or another appropriate location to effect an accurate detection of the indicator.

In one embodiment, an indicator sensor 402 is an inductive, capacitive, or magnetic field sensing sensor that can detect the presence or lack of presence and/or level and/or effect on of an inductance, capacitance, or magnetic field. In another embodiment, the indicator sensor 402 is one or more of an inductive, capacitive, or magnetic field sensing sensor that can detect an inductance, capacitance, or magnetic field corresponding to an amount of the indicator present in a detection zone 404 of the sensor. For example, the indicator sensor 402 may generate an electromagnetic field within a detection zone 404 and detect a change to the electromagnetic field caused by the indicator. A change in the electromagnetic field itself indicates the presence of the indicator. The degree or amount of change to the electromagnetic field can correspond to an amount of indicator in the electromagnetic field.

In another embodiment, an indicator sensor 402 is an inductive proximity sensor configured to detect nonferrous metals, such as aluminum and copper, and the indicator is a nonferrous metal. One example of an inductive indicator sensor 402 has an induction loop. The indicator sensor 402 generates an electromagnetic field. The inductance of the loop changes according to the material inside the electromagnetic field. Since metals are more effective inductors than other materials, the presence of metal increases the current flowing through the loop. The change in the current flowing through the loop can be detected by circuitry in the sensor, and the amount of change can be processed to determine (and correspond to) the presence of the indicator and amount of indicator.

In another embodiment, an indicator sensor 402 is a capacitive proximity sensor. One example of a capacitive proximity sensor detects an object due to its ability to be electrically charged. In this example, the sensor has a circuit that uses an internally supplied direct current (DC) power to generate alternating current (AC) power, to measure current in an internal AC circuit, and to generate an output when the amount of AC current changes.

In another embodiment, an indicator sensor 402 is an indirect sensor that can transmit, emit, radiate, or otherwise project a detection zone 404 for the purpose of detecting the presence or lack of presence and/or level of an indicator near or within an area or detection zone of the indirect sensor. In another embodiment, an indicator sensor 402 is an inductive, capacitive, or magnetic field detecting sensor that can detect a ferro-magnetic element, a nonferrous metal element, or an alloy, as the case may be, in a detection zone 404, and the indicator is the corresponding ferro-magnetic material, nonferrous metal element, or alloy.

In another embodiment, the indicator sensor 402 can detect the presence or lack of presence and optional amount of a biologic, and the indicator is the biologic. Other examples exist.

The toilet 100 optionally includes an indicator concentrating element 406 that concentrates the indicator at, in, or through a detection zone 404 of the indicator sensor 402. The indicator concentrating element 406, for example, attracts the indicator the indicator at, in, or through a detection zone 404 of the indicator sensor 402. In one example, indicator is ferromagnetic, the indicator concentrating element 406 is a magnet or is magnetic, and the indicator concentrating element 406 attracts the ferromagnetic indicator via magnetism so that the ferromagnetic indicator is concentrated at, in, or through a detection zone 404 of the indicator sensor 402.

The indicator concentrating element 406 optionally may be a part of, or in a proximate location to, the indicator sensor 402 in one embodiment. In another embodiment, the indicator sensor 402 optionally generates an electromagnetic field suited for attracting iron or other ferrous particles contained within the absorbent media or other waste treating formulation.

In one example, the indicator concentrating element 406 is a magnetic plate or magnetic collar. In another example, the indicator concentrating element 406 is placed in the interior of the material receiving bowl 104 or on the exterior of the material receiving bowl, such as below or at a bottom portion of the material receiving bowl, or another appropriate location with respect to the material receiving bowl or housing 102 to effect concentration of the indicator at, in, or through a detection zone 404 of the indicator sensor 402. In one example, the composition and location of the indicator concentrating element 406 in the toilet 100 does not interfere with the operation of the indicator sensor 402. That is, the composition and location of the indicator concentrating element 406 does not interfere with the ability of the sensor detector 402 to detect indicator in the detection zone 404. For example, the indicator concentrating element 406 may be a non-ferrous plate having ferrous material attracting properties (e.g. a ceramic magnet) positioned so as not to interfere with the detection of a ferrous indicator by the indicator sensor 402.

In addition to the functions described above, the control circuit 118 of FIG. 4 receives one or more control signals from one or more indicator sensors 402. Each control signal contains a value of, or other data identifying, a detected level or other measurement taken by the indicator sensor. One or more of the values or other data in each control signal identify the presence or lack of presence of the indicator and optionally an amount of indicator when the indicator is present. For example, a value or other data in a control signal may be a digital or analog 1 or 0 (on or off) indicating the presence or lack of presence of the indicator. In another example, the value or other data in a control signal may be a value or level from many possible values or levels that each correspond to a distinct sensor reading and that would each correspond to a different amount of detected indicator. For example, a control signal may have a voltage level or data value.

The control circuit 118 processes the one or more control signals to determine, based on the values or other data in the control signals, whether an indicator is present or not present in a detection zone 406 or other portion of the toilet 100 and determines one or more actions to take, and/or causes one or more actions to be taken by a component of the toilet, based on the determination the indicator is present or is not present in the detection zone or other portion of the toilet. The control circuit 118 then causes the one or more actions to be taken, for example, by transmitting one or more control signals/instructions to one or more devices internal to or external to the toilet. For example, upon determining the indicator is present in the detection zone or other portion of the toilet, the control circuit 118 may transmit a control signal to the agitation device 114 to cause the agitation device to turn on. In another example, upon determining the indicator is not present in the detection zone or other portion of the toilet, the control circuit 118 may transmit a control signal to the agitation device 114 to cause the agitation device to turn off.

In one embodiment, the control circuit 118 processes the one or more control signals to determine, based on the values or other data in the control signals, an amount of indicator that is present in the detection zone 406 or other portion of the toilet and optionally determines one or more actions to take based on the determination of the amount of the indicator detected in the detection zone or other portion of the toilet. The control circuit 118 then determines one or more actions to take, and/or causes one or more actions to be taken by a component of the toilet, for example, by transmitting one or more control signals/instructions to one or more devices internal to or external to the toilet. For example, upon determining the indicator is present in the detection zone or other portion of the toilet and determining an amount of useful life for the absorbent media, the control circuit 118 may transmit a control signal to the agitation device 114 to cause the agitation device to turn on for a period of time corresponding to the remaining useful life of the absorbent media.

In one aspect, the control circuit 118 determines from the indicator sensor control signals the indicator is present in the detection zone, determines the detected level of the indicator from the indicator sensor control signals, determines the detected level of the indicator is a percentage of the base level of the indicator based on the indicator sensor control signals, and uses the detected level of indicator compared to (e.g. divided by) the base level of indicator to result in a remaining level (e.g. percentage) of indicator that corresponds to a remaining level (e.g. percentage) of useful life of the absorbent media. The control circuit 118 optionally then either uses the above resulting remaining level of indicator (e.g. in the case of a percentage) as the remaining level (e.g. percentage) of useful life of the absorbent media, which in this example is the percentage of the base useful life of the absorbent media, or applies that resulting remaining level of indicator (e.g. in the case of a percentage) to the base amount of absorbent media to determine the corresponding remaining amount of absorbent media. The control circuit 118 then causes the one or more actions to be taken, for example, by transmitting one or more control signals/instructions to one or more devices internal to or external to the toilet.

The control circuit 118 optionally uses other sensor input in combination with the sensor inputs from the one or more indicator sensors 402 and takes one or more actions based on one or more inputs from all of the sensors or a group of sensors. For example, the control circuit 118 may transmit a control signal to the agitation device 114 to cause the agitation device to turn on for a period of time corresponding to the remaining useful life of the absorbent media. However, if the occupant sensor 174 senses the user has not yet occupied the toilet 100, the control circuit 118 may delay operation of the agitation device until the occupancy sensor indicates to the control circuit the user sat on the toilet and then got up from the toilet. In this instance, the control circuit 118 receives one or more control signals from the indicator sensor 402 and at least two control signals from the occupant sensor 174, one to indicate occupancy of the toilet by the user and another to indicate no occupancy of the toilet by the user. In another example, the control circuit 118 does not allow the dispenser 146 to dispense absorbent media and/or the indicator until the control circuit receives a control signal from the lid sensor 152 indicating the lid is up, receives another control signal from the bag presence sensor 154 indicating a disposable bag 122 is present, and/or receives another control signal from the absorbent media level sensor 156 indicating there is enough absorbent media to dispense. The control circuit 118 receives control signals sent from each of the sensors and takes actions based on one or a combination of the control signals.

In some instances, the control circuit 118 has or accesses a memory containing characteristics of the indicator. For example, the memory may contain a base value or base level to be detected by the indicator sensor 402 that corresponds to the indicator being present in a predetermined amount (e.g. 100% of the indicator and/or a selected volume of the indicator) (referred to herein as a "base value of the indicator" or "base level of the indicator"), such as one or more conductive values, one or more inductive values, one or more electromagnetic field values, or one or more other values or data that correspond to a measurement taking by the indicator sensor 402 indicating the presence or lack or presence of the indicator and/or an amount of indicator present. One or more other values can be used to correspond to a reduced amount of presence of the indicator based on the data from the indicator sensor 402 data. The memory also may contain a base level of useful life of the absorbent media when the absorbent media is present in a predetermined amount (e.g. 100% of unused absorbent media and/or a selected volume of unused absorbent media).

The control circuit 118 may also access the memory to identify one or more actions to take by the control circuit based on a presence of the indicator or one or more levels or amounts of remaining useful life of absorbent media. For example, the actions may include transmitting a control signal to the agitation device 114 to cause the agitation device to turn on when the indicator is present, transmitting a control signal to the agitation device to turn the agitation device off or keep the agitation device off when the indicator is not present, transmitting a control signal to the agitation device to cause the agitation device to turn from on to off when the indicator is no longer present, transmitting the control signal to the agitation device to cause the agitation device to on for a selected amount of time, transmitting the control signal to the agitation device to cause the agitation device to on for a selected amount of time and then transmitting another control signal to the agitation device to cause the agitation device to off, transmitting a control signal to the agitation device to cause the agitation device to turn on for a selected amount of time corresponding to the remaining useful life of the absorbent media when the agitation device has an internal timer, transmitting a control signal to the agitation device to cause the agitation device to turn on for a selected amount of time corresponding to the remaining useful life of the absorbent media and then transmitting another control signal to the agitation device to turn the agitation device off, transmitting a communication to an internal or external device indicating the remaining useful life of the absorbent media to be displayed on the user interface, transmitting other signals and information to display the other information on a display or other output device or user interface, transmitting a control signal to the dispenser 124 to cause the dispenser to dispense absorbent media, transmitting a control signal to the dispenser to cause the dispenser to not dispense absorbent media, transmitting a control signal to the dispenser to cause the dispenser to dispense indicator, transmitting a control signal to the dispenser to cause the dispenser to not dispense indicator, or transmitting a control signal to an audio, visual, tactile, and/or haptic device of the toilet 100 to cause the audio, visual, tactile, and/or haptic device of the toilet to emit or otherwise generate an audio, visual, tactile, and/or haptic alert or other response, as the case may be, to alert the user the toilet will not function, alert the user of any incompatible substance within the toilet could pose personal or environmental risks or hazards, and/or otherwise alert the user to a state of the toilet.

In one example, the system of FIG. 4 operates as follows. The indicator sensor 402 detects the presence of an indicator in a detection zone 404 by taking a measurement or otherwise detecting a level of an inductance, capacitance, or magnetic field of or impacted by the indicator. The indicator sensor 402 transmits one or more signals to the control circuit 118, each control signal containing a value of or other data identifying a detected level or other measurement taken by the indicator sensor. One or more of the values or other data in the control signals from the indicator sensor identify the presence of the indicator and an amount of indicator. The control circuit 118 processes the control signals received from the indicator sensor 402 and determines from the control signals the indicator is present in the detection zone. The control circuit 118 takes one or more actions based on determining the indicator is present in the detection zone, such as turning on the agitation device 114.

In another example, the absorbent media has a base useful life. A base amount/quantity of the indicator in a base state (state of not being corroded, decayed, or dissolved) may cause the indicator sensor to detect an inductance, capacitance, or magnetic field of or impacted by the indicator at a base detection level. When the indicator has corroded, for example, to half the base amount, the indicator sensor 402 may detect an inductance, capacitance, or magnetic field of or impacted by the indicator at half (50%) the base detection level.

The control circuit 118 takes one or more actions based on determining the indicator is present in the detection zone and/or determining the amount of indicator in the detection zone, such as turning on the agitation device 114, turning the agitation device on for a selected amount of time corresponding to a remaining useful life of the absorbent media, transmitting a communication to an internal or external device indicating the remaining useful life of the absorbent media, or displaying information on a display or other output device or user interface 119 identifying the remaining useful life of the absorbent media.

The control circuit 118 receives the control signals from the indicator sensor 402, processes the control signals, determines from the control signals the indicator is present in the detection zone, determines the detected level of the indicator is half (50%) of the base level of the indicator based on the indicator sensor detection, uses the detected level of indicator compared to (e.g. divided by) the base level of indicator to result in a remaining level (e.g. percentage) of indicator that corresponds to a remaining level (e.g. percentage) of useful life of the absorbent media. The control circuit 118 optionally then either uses the above resulting remaining level of indicator (e.g. in the case of a percentage) as the remaining level (e.g. percentage) of useful life of the absorbent media, which in this example is half (50%) of the base useful life of the absorbent media, or applies that resulting remaining level of indicator (e.g. in the case of a percentage) to the base amount of absorbent media to determine the corresponding remaining amount of absorbent media, which in this example is half (50%) of the base amount of the absorbent media. The control circuit 118 takes one or more actions based on determining the indicator is present in the detection zone and the amount of indicator in the detection zone, such as turning on the agitation device 114 turning the agitation device on for a selected amount of time corresponding to the remaining useful life of the absorbent media, transmitting a communication to an internal or external device indicating the remaining useful life of the absorbent media, or displaying information on a display or other output device or user interface 119 identifying the remaining useful life of the absorbent media.

The control circuit 118 takes one or more actions based on determining the indicator is present in the detection zone and/or determining the amount of indicator in the detection zone, such as turning on the agitation device 114, turning the agitation device on for a selected amount of time corresponding to a remaining useful life of the absorbent media, transmitting a communication to an internal or external device indicating the remaining useful life of the absorbent media, or displaying information on a display or other output device or user interface 119 identifying the remaining useful life of the absorbent media.

In another example, a user places the absorbent media and indicator into the toilet bag and uses the toilet for urination. Later the same day, the user returns to activate the toilet for re-use. The user instructs the toilet is to operate by turning on a switch, by lifting the lid, and/or by occupying the seat. A control signal from the switch, lid sensor 152, and or occupant sensor 174 is transmitted to the control circuit 118 with the corresponding state data. The indicator sensor 402 also generates a control signal to the control circuit 118 corresponding to the corrosion level of the indicator. In this example, the control signal indicates the corrosion level of the indicator did not pass a predefined threshold. The control circuit 118 processes the control signal, determines based on the control signal the corrosion level is above a predefined threshold level, determines no additional absorbent media is needed since the corrosion level is above a predefined threshold level, and transmits a control signal to the user interface 119 causing the user interface to indicate to the user that additional absorbent media is not needed.

Conversely, if prior use of the toilet has sufficiently depleted the effectiveness of the absorbent media, the indicator will be decayed, corroded, dissolved, or otherwise reduced or eliminated. The indicator sensor 402 generates a control signal to the control circuit 118 corresponding to the corrosion level of the indicator. In this example, the control signal indicates the corrosion level of the indicator is at or lower than a predefined threshold, which means the indicator is decayed, corroded, dissolved, or otherwise reduced or eliminated. The control circuit 118 processes the control signal, determines based on the control signal the corrosion level is below a predefined threshold level, determines additional absorbent media is needed since the corrosion level is below the predefined threshold level, and causes the agitation device 114 to remain off, transmits a control signal to the agitation device to instruct the agitation device to turn off, and/or transmits another control signal to the user interface 119 to cause the user interface to alert the user that more absorbent media is needed.

Figure 5:
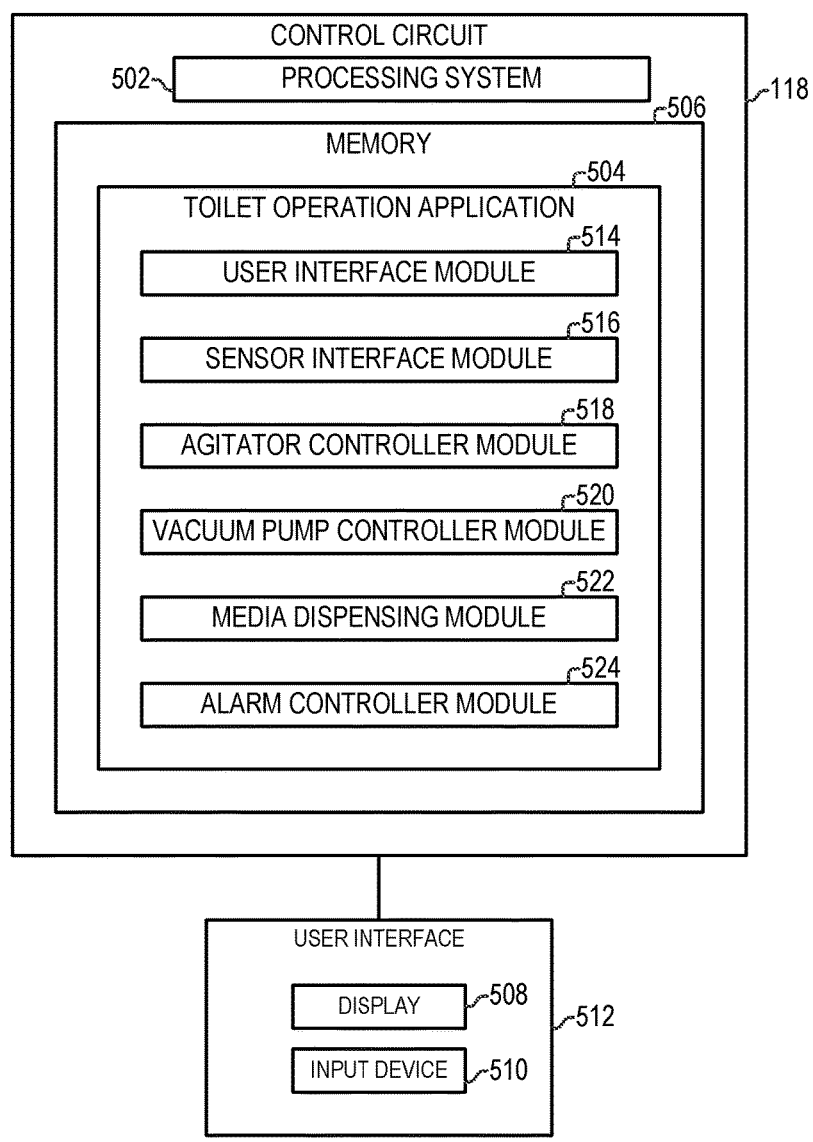
FIG. 5 is a block diagram showing an example control circuit that may be used by the toilet apparatus according to the teachings of the present disclosure.

FIG. 5 illustrates one example of the control circuit 118 that may be used to control the operation of the toilet 100 according to one embodiment of the present disclosure. The control circuit 118 includes a processing system 502 that executes a toilet operation application 504 stored in a memory 506 (e.g., non-transitory computer readable storage media). Although the control circuit 118 is shown and described as a computer-based design incorporating instructions stored in a memory 506 and executed by a processing system 502, the control circuit 118 may be embodied in other specific forms, such as using discrete and/or integrated analog circuitry, field programmable gate arrays (FPGAs), application specific integrated circuitry (ASICs), or any combination thereof.

The processing system 502 includes one or more hardware processors or other processing devices and memory. The one or more hardware processors may process machine/computer-readable executable instructions and data, and the memory may store machine/computer-readable executable instructions and data, including one or more applications, including the toilet operation application 504. A processor is hardware and memory is hardware. The memory 506 includes random access memory (RAM) and/or other non-transitory memory, e.g., a non-transitory computer-readable storage medium, such as one or more flash drives or hard drives. The non-transitory memory may include any tangible computer-readable medium including, for example, magnetic and/or optical disks, flash drives, and the like.

A display 508 may display data from the control circuit 118. Examples of a display include a liquid crystal display (LCD), one or more light emitting diodes (LEDs), an LED display, a touch screen, a capacitive display, or another display for displaying configuration settings associated with the toilet operation application 504.

The control circuit 118 may also receive one or more inputs from an input device 510, such as one or more buttons, switches, a keyboard, a mouse or pointer, a touch screen, or another electro-mechanical device for providing user input to the toilet operation application 504. In one example, the display 508 and input device 510 may include a touch screen display for receiving user input and displaying one or more characteristics associated with operation of the toilet operation application 504. In one embodiment, the display 508 and input device may form a user interface 512 for displaying information to the user and receiving user input from the user.

In general, the processing system 502 executes a toilet operation application 504 with one or more modules to control the operation of the toilet 100. In certain embodiments, the toilet operation application 504 may control all operating aspects of the toilet 100 described herein. In other embodiments, the toilet operation application 504 may control only one or a subset of the operating aspects of the toilet 100 described herein.

A user interface module 514 facilitates the receipt of user data and/or other communications from the input device 510 of the control circuit 118. In one example, the user interface module 514 generates an interactive display, such as to the display 508 or other suitable user interface mechanism, which optionally may include one or more selectable fields, editing screens, or the like for displaying status information associated with one or more aspects of the toilet operation application 504, such as indicator status, remaining useful life of the absorbent media, whether absorbent media and/or indicator should be dispensed or not, operational status information for the toilet, power source (e.g., battery) condition, timer values to be applied to the operation of the agitator, the vacuum pump, absorbent media dispenser, and the like.

A sensor interface module 516 monitors the various sensors 152, 154, 156, 172, and 402 configured on the toilet 100, receives one or more control signals from one or more of the sensors, processes the one or more control signals from the one or more sensors to determine one or more actions to be taken based on the one or more sensor control signals, and generates one or more control signals to be used by the one or more other modules of the toilet operation application 504 and/or one or more components of the toilet for the operation of the toilet. For example, the sensor interface module 516 may continually monitor the lid position sensor 152, and generate a signal that may be used by the agitator controller module 518 and/or vacuum pump controller module 520 for controlling the operation of the agitation device (e.g., agitation device 114 or absorbent media agitation device 158), and/or vacuum pump 116, respectively. As another example, the sensor interface module 516 may monitor the bag presence sensor 154, such as after the lid position sensor 152 detects that the lid 110 has been opened and/or other times and generate a signal that may be used by the alarm controller module 524 to generate an alarm if the bag 122 has not been placed within the bowl 104 after a specified period of time. As yet another example, the sensor interface module 516 may monitor the absorbent media level sensor 156 to determine whether the level of the absorbent media 124 stored in the lid 110 has been reduced to a specified level, and generate a signal that may be used by the alarm controller module 524 when the level of the absorbent media is below the specified level. As yet another example, the sensor interface module 516 may monitor the humidity sensor 172 to selectively energize the ultraviolet lamp 170 according to a humidity level inside of the bowl 104 or bowl 104/bag 122.

As yet another example, the sensor interface module 516 may receive one or more control signals from one or more indicator sensors 402, processes the one or more control signals from the one or more indicator sensors to determine one or more actions to be taken based on the one or more sensor control signals (as described above with respect to the control circuit), and generates one or more control signals to be used by the one or more other modules of the toilet operation application 504 and/or one or more components of the toilet for the operation of the toilet. The sensor interface module 516 may process control signals or inputs from multiple sensors to determine an action to be taken or not taken (as described above with respect to the control circuit).

For example, the sensor interface module 516 may determine, based on a presence of the indicator or one or more levels or amounts of remaining useful life of absorbent media, to transmit a control signal to the agitation device 114 to turn the agitation device on when the indicator is present, transmit a control signal to the agitation device to turn the agitation device off or keep the agitation device off when the indicator is not present, transmit a control signal to the agitation device to turn the agitation device from on to off when the indicator is no longer present, transmit a control signal to the agitation device to turn the agitation device on for a selected amount of time corresponding to the remaining useful life of the absorbent media and then transmit another control signal to the agitation device to turn the agitation device off, transmitting a communication to an internal or external device indicating the remaining useful life of the absorbent media to be displayed on the user interface 512, or transmitting other signals and information to display the other information on a display or other output device or user interface 512.

The sensor interface module 516 further may access memory containing characteristics of the indicator. For example, the memory may contain a base value or base level to be detected by the indicator sensor 402 that corresponds to the indicator being present in a predetermined amount (e.g. 100% of the indicator and/or a selected volume of the indicator) (referred to herein as a "base value of the indicator" or "base level of the indicator"), such as one or more conductive values, one or more inductive values, one or more electromagnetic field values, or one or more other values or data that correspond to a measurement taking by the indicator sensor 402 indicating the presence or lack or presence of the indicator and/or an amount of indicator present. One or more other values can be used to correspond to a reduced amount of presence of the indicator based on the data from the indicator sensor 402 data. The memory also may contain a base level of useful life of the absorbent media when the absorbent media is present in a predetermined amount (e.g. 100% of unused absorbent media and/or a selected volume of unused absorbent media).

The sensor interface module 516 further may access memory that contains an identification of one or more actions to take by the sensor interface module based on a presence of the indicator or one or more levels or amounts of remaining useful life of absorbent media. For example, the actions may include turning the agitation device on when the indicator is present, turning the agitation device off or keeping the agitation device off, when the indicator is not present, turning the agitation device from on to off when the indicator is no longer present, turning the agitation device on for a selected amount of time corresponding to the remaining useful life of the absorbent media, transmitting a communication to an internal or external device indicating the remaining useful life of the absorbent media, or displaying information on a display or other output device or user interface 512 identifying the remaining useful life of the absorbent media.

An agitator controller module 518 is coupled to the agitation device (e.g., vibration mechanism 114, absorbent media agitation device 158, or other agitation mechanism) and controls the operation of the agitation device, such as whether the agitation device is on or off. For example, the agitator controller module 518 may include a timer that turns the agitation device on or off after a specified period of time. In one embodiment, the agitator controller module 518 may be configured to turn the agitation device partially on, such as via a pulse width modulation (PWM) algorithm, that causes the agitation device to operate at a fraction of its fully on power. The vibrator controller module 518 may include multiple partially on settings for optimizing the agitation of different types of absorbent media having differing sizes, weights, and resiliency.

A vacuum pump controller module 520 controls the operation of the vacuum pump 116. For example, the vacuum pump controller module 520 may receive signals from the sensor interface module 516 indicating whether the lid 110 is in the open position and whether the bag has been inserted into the bowl, and if so, turn on the vacuum pump 116 so that the disposable bag 122 may be urged against the side of the bowl 104. The vacuum pump controller module 520 may also be responsive to signals from the user interface module 514 to turn off the pump in response to user input so that the disposable bag 122 may be removed from the bowl 104 or to turn on the pump.

A media dispensing module 522 controls the operation of the dispenser 146 to dispense absorbent media, indicator, and optionally treatment to the disposable bag 122. When the dispenser 146 dispenses the absorbent media and the indicator, the media dispensing module 522 controls the operation of the dispenser to dispense the absorbent media and the indicator. When the dispenser 146 also dispenses treatment, the media dispensing module 522 controls the operation of the dispenser to dispense the treatment.

For example, the absorbent media dispensing module 522 may receive signals from the sensor interface module 516 indicating whether the lid 110 is in the open position and whether the bag has been inserted into the bowl, and if so, turn on the dispenser 146 for a specified period of time so that a certain amount of absorbent media and/or a certain amount of indicator may be dispensed from the dispenser into the disposable bag 122. For example, the dispenser 146 may be responsive to a switch and/or other control circuit 118 hardware to dispense absorbent media and/or indicator into the disposable bag 122.

An alarm controller module 524 communicates with the other modules (e.g., the user interface module 514, the sensor interface module 516, the agitator controller module 518, and the vacuum interface module 520) to receive signals indicative of an alarm condition, and generate an alarm signal based on those signals. For example, if the alarm controller module 524 receives a signal from the sensor interface module 516 indicating that no bag 122 is present in the bowl 104 when the absorbent media dispensing module 522 turns on the dispenser 146 to dispense absorbent media and/or indicator, the alarm controller module 524 may generate an alarm and communicate with the absorbent media dispenser controller 522 to turn off the dispenser 146 until a bag 122 is placed in the bowl 104. As another example, the alarm controller module 524 may receive signals from the sensor interface module 516 indicating that the level of the absorbent media 124 in the lid 110 is below a specified threshold level and generate an alarm to alert the user that additional absorbent media 124 needs to be added to the hopper 134.

It should be appreciated that the modules described herein are provided only as an example of a computing device that may execute the toilet operation application 504 according to the teachings of the present disclosure, and that other computing devices may have the same modules, different modules, additional modules, or fewer modules than those described herein. For example, one or more modules as described in FIG. 5 may be combined into a single module. As another example, certain modules described herein may be encoded and executed on other circuits, such as another circuit that is separate from the control circuit 118.

Figure 6A:
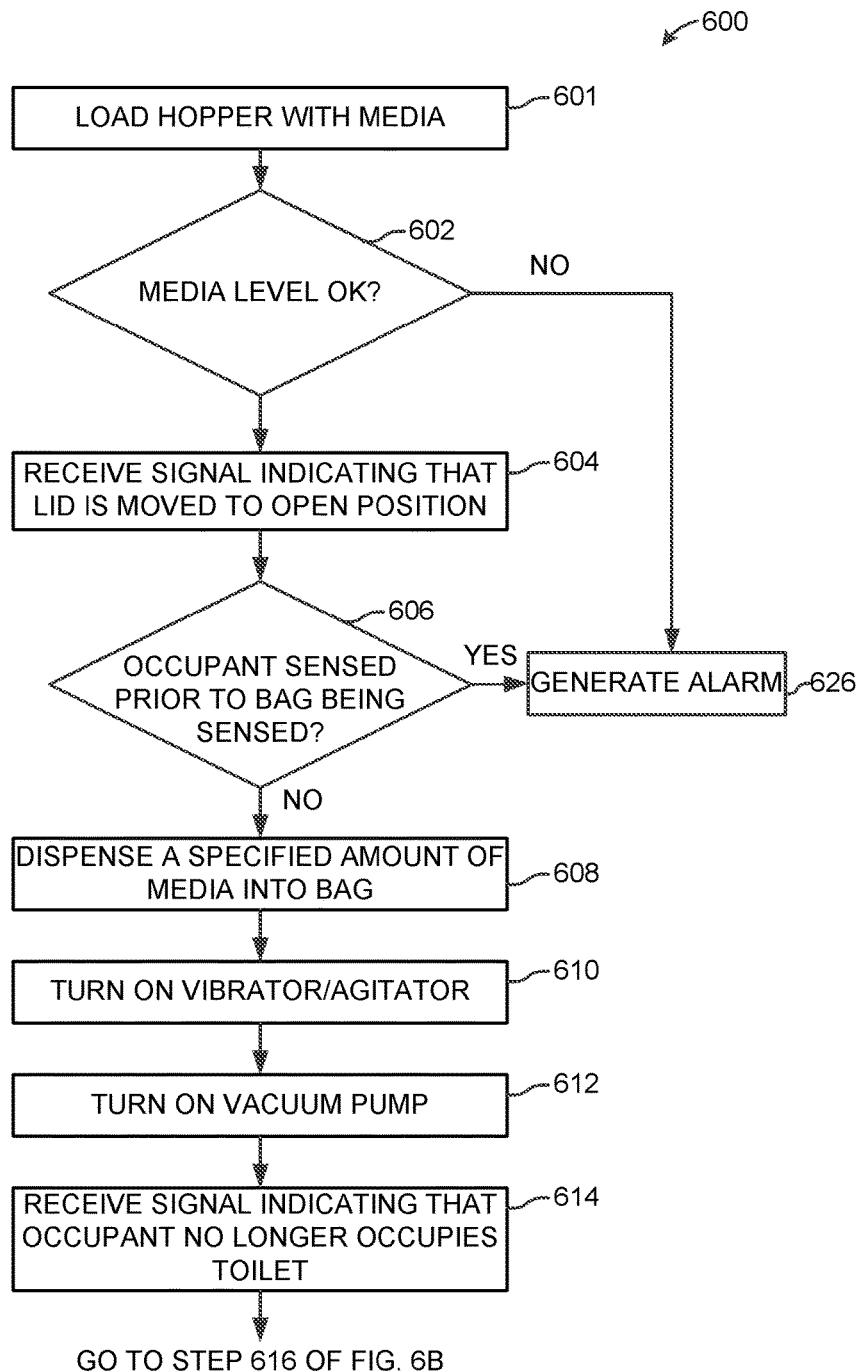
FIGS. 6A-6D illustrate an example process that may be performed by the application according to the teachings of the present disclosure.
Figure 6B:
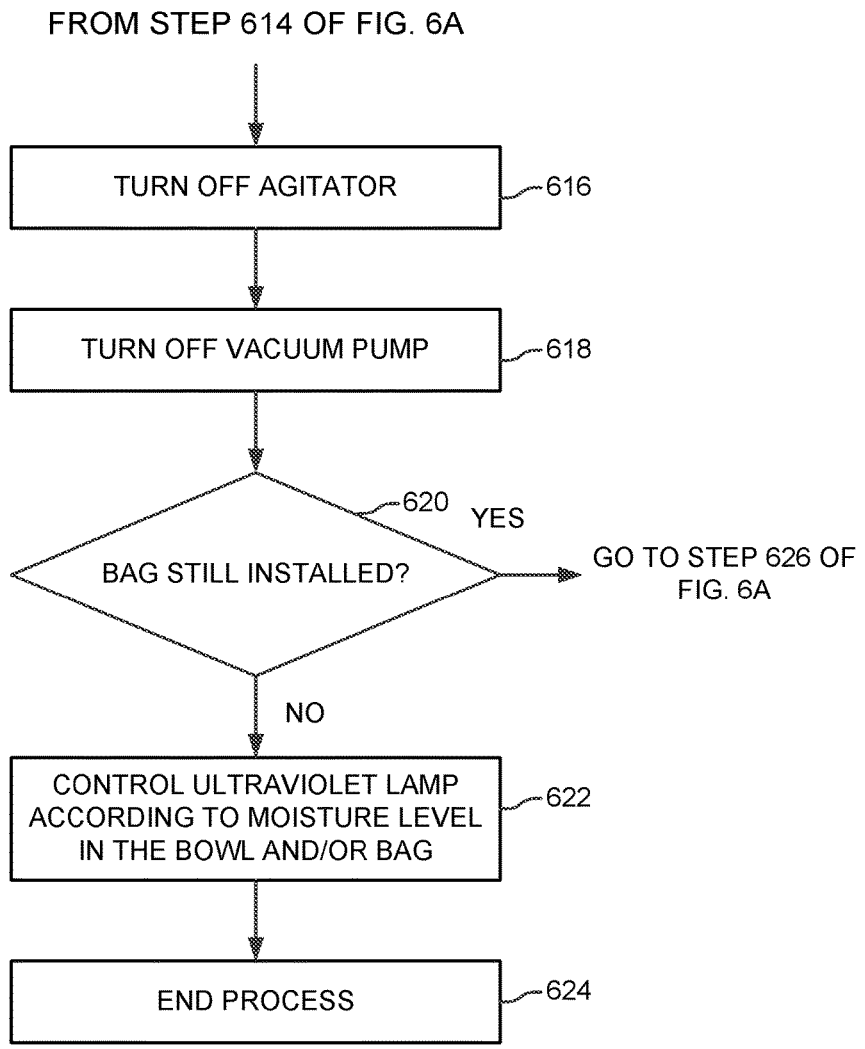

FIGS. 6A-6B illustrate an example process that may be performed by the toilet operation application 504 according to the teachings of the present disclosure to control the operation of the toilet 100. Although the example process described herein below is directed primarily to a computer-based application implemented in a memory and executed by a processor, the steps described herein may also be applicable to other types of control circuits, such as a digital or analog hardware circuit employing discrete electrical components.

Initially in step 601, the absorbent media hopper 134 may be loaded with absorbent media and/or indicator by moving the lid 110 to the open position, opening the access door 144, and pouring the and/or indicator into the absorbent media hopper and/or indicator hopper. Also, an air filter 172 may be placed over the outlet of the vacuum pump 116. Thereafter, the toilet 100 and associated toilet operation application 504 are ready for use.

In step 602, the toilet operation application 504 determines, using an absorbent media level sensor and/or indicator level sensor, whether the absorbent media level is sufficient and the indicator level is sufficient. If so, processing continues at step 604; otherwise, processing continues at step 626 in which an alarm is generated using a suitable output mechanism, such as the user interface 512 of the control circuit 118. In one embodiment, the toilet operation application 504 may also display a message on the user interface 512 informing the user to add additional absorbent media and/or indicator to the respective media hopper.

In step 604, the toilet operation application 504 receives a signal from the lid position sensor 152 indicating that the lid 110 has been moved to the open position. Receipt of the signal from the lid position sensor 152 typically indicates that the toilet is being prepared for use.

In step 606, the toilet operation application 504 determines, using the occupant sensor 174, whether a signal has been received indicative of the user occupying the toilet 100 prior to a signal received from the bag sensor 154. If not, processing continues at step 608; otherwise processing continues at step 626 in which an alarm is generated to alert the user that the toilet 100 is being improperly used. Additionally, the toilet operation application 504 may generate, using the user interface 512 that a bag 122 should be installed prior to occupying the toilet 100.

In step 608, the toilet operation application 504 controls the dispenser 146 to dispense a specified amount of absorbent media and/or indicator into the bag 122. The specified amount of absorbent media and/or indicator may be set according to various factors, such as how long the dispenser 146 is energized, the speed of the dispenser 146, and the weight and/or granularity of the absorbent media and/or indicator. The toilet operation application 504 may cause the dispenser 146 to immediately dispense the absorbent media and/or indicator, or it may wait for a specified period of time (e.g., approximately 1 to15 seconds) prior to having the absorbent media and/or indicator dispensed. For example, the toilet operation application 504 may be configured to wait for approximately 5 seconds after the bag sensor 154 has detected the presence of the bag 122 to allow the user to releasably secure the bag 122 to the bowl 104. In an alternative embodiment, the toilet operation application 504 may be responsive to user input inputted from either the user interface 512 or a switch mounted on the housing 102 to manually control the dispenser 146 for dispensing the absorbent media and/or indicator.

In steps 610 and 612, the toilet operation application 504 turns on the agitation device (e.g., agitation device 114, absorbent media agitation device 158, or other agitation mechanism) and the vacuum pump 116, respectively. For example, the toilet operation application 504 may turn on the agitation device and/or vacuum pump 116 immediately after the dispenser 146 has been turned off, or after a specified period of time after the dispenser 146 has been turned off or in response to one or more sensor inputs, such as the occupant sensor 174 indicating the presence of an occupant or other sensor. In an alternative embodiment, the toilet operation application 504 may be responsive to user input inputted from either the user interface 512 or one or more other switches mounted on the housing 102 to turn the agitation device and/or vacuum pump 116 on. Additionally, the agitation device may be turned on simultaneously with the vacuum pump 116 or at a different time from when the vacuum pump 116 is turned on.

In step 614, the toilet operation application 504 receives a signal from the occupant sensor 174 indicating that the occupant no longer occupies the toilet 100. Thereafter, the toilet operation application 504 turns off the agitation device 114/absorbent media agitation mechanism 158 and/or vacuum pump 116 in steps 616 and 618.

In step 620, the toilet operation application 504 determines whether a signal has been received from the lid position sensor 152 indicating that the lid 110 has been moved to the closed position prior to a signal received from the bag sensor 154 indicating that the disposable bag 122 has been removed from the bowl 104. If not, processing continues at step 622; otherwise processing continues at step 626 in which an alarm is generated to alert the user that the bag 122 needs to be removed from the toilet 100. Additionally, the toilet operation application 504 may generate, using the user interface 512, that the bag 122 should be removed from the bowl 104 prior to closing the lid 110.

In step 622, the toilet operation application 504 continually monitors the moisture level inside the bowl 104 or the bag 122 if still inside the bowl 104 using the humidity sensor 172 to control operation of the ultraviolet lamp 170 when the toilet 100 is not in use. For example, after use of the toilet 100, humidity levels inside the bowl 104 may remain at an elevated level for an extended period of time, particularly if the bag 122 is inadvertently left inside of the bowl 104. To maintain the toilet 100 in a sanitary condition, the toilet operation application 504 may activate the ultraviolet lamp 170 such that any pathogens, such as germs and/or bacteria, may be reduced or eliminated.

Processing continues for additional usage cycles of the toilet 100 as described above with reference to steps 602 through 622. Nevertheless, when use of the toilet 100 and associated toilet operation application 504 are no longer needed or desired, the process ends in step 624.

Figures 6C, 6D:
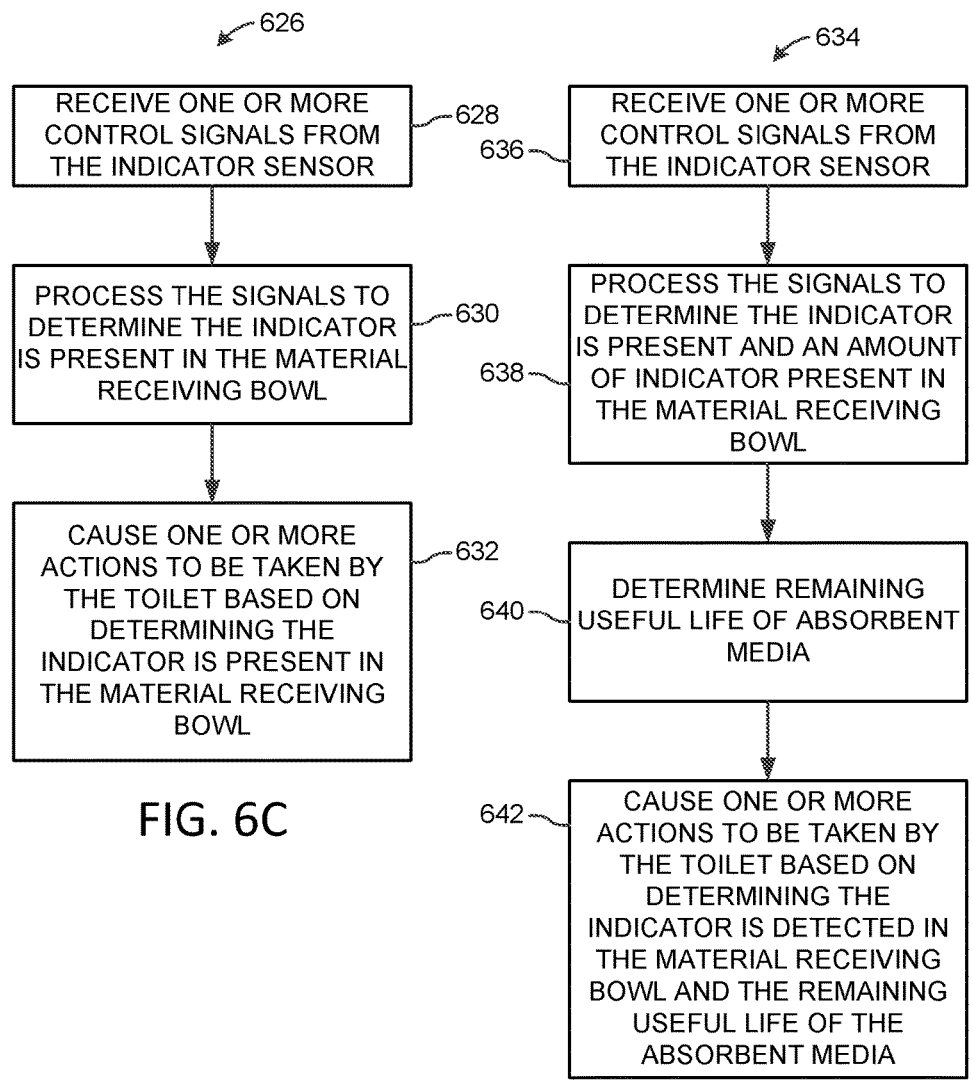

FIGS. 6C-6D illustrate an example process that may be performed by the toilet operation application 504 according to the teachings of the present disclosure to control the operation of the toilet 100. FIG. 6C depicts one process 626 performed by the toilet operation application 504 for toilet operation application of the control circuit 118 to process one or more control signals from the indicator sensor 402. At step 628, the toilet operation application 504 receives one or more control signals from the indicator sensor 402. At step 630, the toilet operation application 504 processes the signals to determine the indicator is present in the material receiving bowl. At step 632, the toilet operation application 504 causes one or more actions to be taken by the toilet based on determining the indicator is present in the material receiving bowl.

FIG. 6D depicts another process 634 performed by the toilet operation application 504 for toilet operation application of the control circuit 118 to process one or more control signals from the indicator sensor 402. At step 636, the toilet operation application 504 receives one or more control signals from the indicator sensor 402. At step 638, the toilet operation application 504 processes the signals to determine the indicator is present and an amount of indicator present in the material receiving bowl. At step 640, the toilet operation application 504 determines the remaining useful life of absorbent media, such as based on the amount of indicator detected in the material receiving bowl. At step 642, the toilet operation application 504 causes one or more actions to be taken by the toilet based on determining the indicator is present in the material receiving bowl and determining the remaining useful life of the absorbent media.

FIG. 7 illustrates an example computing system 700 that may implement various systems, such as the control circuit 118, and methods discussed herein, such as process 600. A general purpose computer system 700 is capable of executing a computer program product to execute a computer process. Data and program files may be input to the computer system 700, which reads the files and executes the programs therein such as the toilet operation application 504. Some of the elements of a general purpose computer system 700 are shown in FIG. 7 wherein a processing system 702 is shown having an input/output (I/O) section 704, a hardware central processing unit (CPU) 706, and a memory section 708. The processing system 702 of the computer system 700 may have a single hardware central-processing unit 706 or a plurality of hardware processing units. The computer system 700 may be a conventional computer, a server, a distributed computer, or any other type of computing device, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other hardware media or hardware mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 704 is connected to one or more optional user-interface devices (e.g., a user interface such as a keyboard 716 or the user interface 512), an optional disc storage unit 712, an optional display 718, and an optional disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 708, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by a floppy drive unit, a tape drive unit, or other storage medium drive unit. An optional network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 712 or the DVD/CD-ROM medium 710, and/or other external storage devices made available and accessible via a network architecture. The source code executed by the control circuit 118 may be embodied by instructions stored on such storage systems and executed by the processing system 702.

Some or all of the operations described herein may be performed by the processing system 702, which is hardware. Further, local computing systems, remote data sources and/or services, and other associated logic represent firmware, hardware, and/or software configured to control operations the system 100 and/or other components. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

Example Fibrous Pellet Processing for Absorbent Media

In one embodiment, an absorbent media is produced from fibrous pellets. However, the fibrous pellet processed absorbent media is not the only absorbent media that may be used. Any of the other absorbent media disclosed herein and equivalents may be used in the toilet system.

Fibrous Absorbent Material

A waste absorbing media having an absorbent material is provided for use with dry toilets. The waste absorbing media can be a fibrous material. In one embodiment, the fibrous material is a wood or cellulose pellet. When existing commercially available pellets make contact with solid or semi liquid biological waste, the outer plasticized shell limits absorption of the surrounding liquid and the shell does not quickly degrade to allow the finer fibers inside the shell to contact and subsequently absorb liquids or odors.

In one embodiment, wood and cellulose pellets are used as the absorbent material. To increase the absorbing capacity of the wood or cellulose pellets, for use in the waste absorbing, waste treatment, and composting applications herein, the pellets are dried or heated and treated. First, the wood or cellulose pellets are dried or heated. Examples of drying methods for the pellets include, but are not limited to, subjecting the pellets to long term low humidity environments, micro-waved, kiln dried, or dried in another fashion. In one embodiment, the pellets are subjected to heating between 200° to 400° Fahrenheit (F) until water vapors or the moisture associated with the pellets have evaporated or have been minimized. Additionally, oils in the pellets may be allowed to escape the pellets by heating, such as roasting the pellets at approximately 350° F. until such a time that a small amount of charring occurs on the outer shell of the pellet. Though, other temperatures may be used that allows for the roasting and charring of the pellets. It is noted a higher temperature (above 200° F.) degrades the outer shell of a wood pellet. Therefore, a roasting or drying temperature of above 200° F. is desired. During roasting or drying, the appearance of the shell becomes comparatively opaque, which demonstrates a breakdown or weakening of the outer shell. The pellet remains in a compromised but still compressed state. After the pellets are processed with the heating and/or drying step, the pellets may be allowed to cool to an ambient temperature for further processing.

In an additional embodiment the absorbent material can include clay, sawdust, hydrogels, superabsorbent polymers (SAPs), vermiculite, natural fibers, zeolites, silica gel, activated carbon, sodium polyacrylate, and combinations thereof.

Liquid Treatment of Absorbent Material

A liquid solution is created that is then combined with the absorbent material, such as the dried pellets, to create the waste absorbing media for use in a composting toilet. This solution may comprise one or more of enzymes, microbes, aromatic fragrances and a solution of bactericidal compounds. The solution may contain known ingredients that safely digest waste. The solution may contain a combination of ingredients that act as a sanitizer, with an amount of antimicrobial agents that prevent the proliferation of bacteria, viruses, yeasts, fungi, and other harmful pathogens.

In an embodiment, where the absorbing formulation is used as a sanitization composition, a sufficient quantity of antimicrobial, bactericidal, or other sanitization compounds can be included to inhibit the proliferation of pathogens or kill pathogens to allow for the safe transportation and disposal of any waste product and the absorbing compound that has been in contact with the waste product. In another embodiment, a solution designed for a homeowner may contain only natural enzymes and bacteria to allow for ease of disposing of the waste safely, such as on a user's own property.

The liquid solution may contain a detergent, an acid (such as acetic acid), a surfactant, hydrogen peroxide, sodium per carbonate, methanol, ethanol, or any combination of detergent, acid, methanol, and/or ethanol. Alternatively, the liquid solution could be any commercially viable bactericide, waste treatment, malodor treatment, enzymatic solution or any combination of bactericide, waste treatment, malodor treatment, and/or enzymatic solution.

The liquid solution is combined with the fibrous pellet absorbent media to allow its absorption into the pellets, or absorbent material, to create the waste absorbing media. The liquid is exposed to the pellets for a sufficient amount of time for absorption (liquid absorption cycle). In one embodiment, the combination of the liquid and pellets can be accomplished through the pellets being added to a container that includes the liquid solution for an amount of time sufficient for the absorption and creation of the waste absorbing media. In another embodiment, the liquid solution can be sprayed on the pellets allowing for the absorption or adhesion of the liquid solution to the absorbent material.

As the pellets complete the liquid absorption cycle the pellets will begin to breakdown. The breakdown or disintegration rate, and amount, of the pellets are dependent upon the composition of the pellets and the composition of the liquid solution. The acid content, volatility, or other properties of the liquid ingredient effects absorption of the liquid solution and breakdown of the pellets. An example using typical pine pellets and a liquid solution comprising vinegar results in a rapid and large breakdown of the pellets. In comparison, a liquid solution comprising methanol results in a much slower and smaller breakdown ratio.

In another embodiment, an amount of the liquid solution and pellets can be added to the desired packaging material and sealed with the indicator to create the waste absorbing media with communication capabilities within the package. In this example, the liquid solution is or includes an anti-corrosive additive to prevent premature corrosion of the indicator within the sealed package. An example of an anti-corrosive additive is mineral oil or vegetable oil. An example of an anti-corrosive liquid is methanol.

The benefits of the disclosed method of compromising the structural integrity of the compressed pellet by heating or drying the pellets and then adding a liquid solution include:
- minimizing dust contamination in the processing facility reduces worker exposure;
- the absence of mechanical crushing machines results in a finished product that requires less energy to produce this low cost process takes advantage of energy already consumed in the pellet manufacturing process; and
- the natural absorbing substance can be embedded with a more desirable liquid.

Packaging and Delivery

Once the fibrous pellet absorbent media has been processed as described above, an amount of pellets, for example, in the range of between 60 ml to 240 ml, are placed in a plastic sleeve, a paper sleeve with a liquid impermeable coating, or other suitable packaging. It may be preferable that sequenced filling of ingredients be observed to ensure proper layering such that the indicator is sufficiently dispersed among the dried pellets. In one example of a single-use waste-composting packet for use with a waterless toilet, 100 ml of pellets are placed into a 200 ml packaging sleeve, and 0.1 ml to 10.0 ml of the indicator is added into the package. In another example, a 200 ml packaging sleeve is filled with 100 ml of fibrous pellet absorbent media and 0.01 grams to 30.0 grams of indicator. The sleeve can be sealed once all material is added to prevent corrosion of the indicator. The packaging sleeve now contains waste absorbing media with communication capabilities.

The packaging process may also include providing nutrients for enzymes or bacteria into the packaging sleeve suited for natural decomposition of waste. A relatively small amount of bacteria and/or enzymes may be cultured and multiplied while inside the packaging sleeve. After a period of time, the nutrient/biologically active composition in the packaging sleeve may be cultured to maturity.

The waste absorbing media with communication capabilities included in the package contains absorbing fibers, or absorbent material, that are fine enough to cling to solid or semi-solid human waste, medium size grains/pellets that both cling to solid or semi-solid waste and rapidly decay into small fibers when wetted, and larger pellets that have a compromised outer shell that rapidly decay into small fibers in the presence of high humidity. In a toilet system that employs non-direct contact agitation with the waste absorbing media, the mechanical pulses of the toilet system aid in further pellet decomposition prior to defecation or urination into the toilet bag. This pre-decomposition of larger pellets aids in covering a large surface area of the bottom of the toilet bag. This is especially helpful in ensuring a high amount of blending by preventing solid waste from clinging to the floor of the bag. In one embodiment, the pellets that contain wood or cellulose fibers have been slightly charred in the drying process, and trace amounts of creosote are present for aroma and bactericidal characteristics.

Additionally, the waste absorbing media may contain a solution of ingredients that are beneficial to the waste disposal or composting process. These ingredients may include anti-dusting, surfactants, reactants, fragrance, bactericidal, or organic compounds.

Pre-Agitation in Indirect Contact Toilet

Upon depositing the fibrous-type pellet absorbent media, indicator, and optional treatment (collectively, "formulation") into the toilet, the toilet control circuit optionally can activate the agitation device for a pre-agitation stage. The control circuit activates the pre-agitation while the formulation is deposited into the receiving bowl, bag, or other container of the toilet. During this time, the formulation is encouraged onto a relatively large surface area on the floor of the bag resting upon the bottom member. This pre-agitation also causes larger compromised fibrous pellet absorbent media to break apart further. Additionally, during this time the formulation has decompressed further and dehumidified. The dehumidifying and decomposition of the formulation is dependent on the composition of the fibrous pellet absorbent media, the viscosity and volatility of the liquid solution used in the manufacture of the formulation, ambient conditions in the immediate environment, and wait time until liquid, semi liquid, or solid waste is introduced into the formulation.

Exemplary Methods of Using the Waste Absorbent Media

After the formulation is spilled into the receiving bowl, toilet bag, or other container of the toilet by the user, detected by the indicator sensor(s), and determined to be present by the control circuit 118, many scenarios arise for the formulation.

Scenario 1: Urine is Introduced Only. When urine is introduced into the formulation, the small particles of the fibrous pellet absorbent media act as instant absorbers. The medium size particles of the fibrous pellet absorbent media can further decompose and absorb urine at a slightly slower rate. These medium size particles reduce or lose the ability to remain bonded together. The medium grains breakdown through absorption and due to the acid typically present in urine. The larger size particles of the fibrous pellet absorbent media are mostly intact and are the last component that decomposes in the presence of urine. When compared to a wood pellet that has not under gone the disclosed manufacturing process, the compromised fibrous pellet absorbent media in this formulation will decompose and absorb liquid urine at least two times faster than an unprocessed pellet of the same origins. In some embodiments, the larger fibrous pellet absorbent media pellets in this formulation decompose and absorb liquid urine at least five times faster than a wood pellet not subjected to the disclosed process. Once urine has been introduced into this formulation, the formulation/urine combination is displaced over a large matrix area. This formulation, especially when subjected to indirect mechanical or other physical manipulation, creates an environment and state suited for accelerated drying of liquids. Additionally, the formulation is not conducive to clumping or re-bonding to itself. The resulting mass is easily manipulated by indirect mechanical agitation. This damp mass will have displaced a concentrated liquid solution of malodor or other treatment ingredients over virtually its entirety by blending with liquid urine. In this scenario, the indicator is dampened by urine but remains within a detection field of the indicator sensor and largely intact at least initially.

Scenario #2—Dry Waste Only. In this example, the fibrous pellet absorbent media includes small, medium, and large sized pellets. Upon introduction of solid waste with low liquid content, the small fibers in the fibrous pellet absorbent media cling to the solid waste. Generally, relatively dry solid waste emits less odor than liquid or semi liquid waste. Medium sized pellets in the fibrous pellet absorbent media will begin to decompose and cling to the warm solid waste with increased agitation. Eventually, the agitation produced by the agitation device of the toilet will encourage the medium and large sized pellets to penetrate the softer but relatively dry solid waste. Over a period of time, even the larger but compromised pellets will begin to decompose into smaller fibers capable of further absorption. It is noted the indicator in this scenario may be removed from the proximity sensing field by means of clinging to even relatively dry waste. In this condition, the formulation may or may not be suited for further use.

Scenario #3—Semi Liquid Waste. In this scenario, semi-liquid waste that is typically odorous is introduced into the formulation. The small decomposed fibers rapidly cling to semi liquid waste. The medium pellets of the fibrous pellet absorbent media rapidly cling and break down as well. The large pellets of the fibrous pellet absorbent media compromised by this processing process described above cling to semi liquid waste but aren't immediately decomposed into small fibers. Over time, the large compromised pellets breakdown and absorb remaining liquids and malodor. In this scenario, the indicator compound of the fibrous pellet absorbent media clings to the semi liquid waste.

Scenario #4—Vomit. In this scenario, vomit is introduced into a waste management device such as an indirect contact agitating toilet. The formulation is spilled into a toilet bag prior to the introduction of warm, vomitous substances. As in prior scenarios, the fine fibers of the formulation absorb liquid from vomit on contact. Medium pellets and larger pellets compromised by the above-referenced processing process are decompressed and decomposed almost instantly by vomitous fluids, especially vomitous fluids containing large amounts of stomach acids. Trace amounts of lignin or trace amounts of artificial glues used in the pelletizing process are susceptible to rapid decomposition when exposed to acids. In this scenario, the indicator may be rapidly corroded, dissolved, or otherwise compromised.

Scenario #5—Combinations—Repeated Use. When considering many scenarios associated with a dry toilet, it is important to recognize the behavior of the fibrous pellet absorbent media and indicator. For example, when scenario #3 is introduced first, then Scenario #1 occurs, the indicator may tend to detach from the semi liquid waste. When urine is added to the composition of semi liquid waste, absorbent media, and indicator, a loosening of bonds may occur. This activity has a dispersing effect on the formulation's ingredients. A wetting and lower density result may allow the indicator to migrate in a concentrated form. The introduction of the urine will begin an accelerated corrosion of the indicator in this example.

Detecting Compatible Media

Yet another advantage of the disclosure is the ability for a toilet to detect the suitability of an original dose of the formulation to be reused. For example, a one-use package is deposited into a bag for the toilet. The new one-use dose of the formulation is capable of absorbing and treating 200 ml of urine from emitting odor. In this scenario, only 40 ml of urine is added. Absorbing and odor control are easily accomplished, and the fibrous pellet absorbent media completely decomposes. However, the indicator is only exposed to a mild corrosive effect. The indicator will remain intact for subsequent use. The control circuit of the toilet may be configured to detect this event and allow repeated subsequent use of the original dose of the formulation.

Alternative Absorbent Fibrous Material

Alternative examples of absorbent media would be corn cob, walnut, sawdust, silica sand, or gel as well as super absorbing polymers and the like. Such examples can consist of consistent or random particle sizes.

Adhering the Indicator

It is also contemplated that the indicator could be adhered to or impregnated on absorbent media particles. In such embodiments, indicator sensor calibration may be required.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A toilet apparatus comprising:
  a waste material receiving bowl having an opening to receive an absorbent media and indicator;
  a sensor to detect a presence of the indicator in the material receiving bowl when the indicator is present in the material receiving bowl and transmit a signal indicating the indicator is present in the material receiving bowl; and
  a control circuit to receive the signal from the sensor, process the signal to determine the indicator is present in the material receiving bowl, and cause one or more actions by the toilet apparatus when the indicator is present in the material receiving bowl.

2. The toilet apparatus of claim 1 wherein the control circuit causes the one or more actions to be taken by at least one of: transmitting a control signal to the agitation device to cause the agitation device to turn off, transmitting the control signal to the agitation device to cause the agitation device to keep off, transmitting the control signal to the agitation device to cause the agitation device to turn on for a selected amount of time, transmitting the control signal to the agitation device to cause the agitation device to turn on for a selected amount of time and then transmitting another control signal to the agitation device to cause the agitation device to off, transmitting the control signal to the dispenser to cause the dispenser to dispense absorbent media; transmitting the control signal to the dispenser to cause the dispenser to not dispense absorbent media; transmitting the control signal to the dispenser to cause the dispenser to dispense indicator; transmitting the control signal to the dispenser to cause the dispenser to not dispense indicator; transmitting the control signal to an audio, visual, tactile, and/or haptic device of the toilet to cause the audio, visual, tactile, and/or haptic device of the toilet to generate an audio, visual, tactile, and/or haptic alert, and/or transmitting information to be displayed on a display.

3. The toilet apparatus of claim 1 wherein the control circuit processes the signal to determine, based on data in the signal, an amount of the indicator that is detected by the sensor and determines the one or more actions based, in part, on determining the amount of the indicator detected in the detection zone of the sensor.

4. The toilet apparatus of claim 1 wherein the control circuit processes the signal to determine, based on data in the signal, an amount of the indicator that is detected by the sensor, determines a remaining useful life of the absorbent media based on the value or other data in the signal, and determines the one or more actions when the indicator is present and determining the remaining useful life of the absorbent media.

5. The toilet apparatus of claim 4 wherein the control circuit causes the one or more actions to be taken by at least one of: transmitting a control signal to the agitation device to cause the agitation device to turn off, transmitting the control signal to the agitation device to cause the agitation device to keep off, transmitting the control signal to the agitation device to cause the agitation device to turn on for a selected amount of time corresponding to the remaining useful life of the absorbent media, transmitting the control signal to the agitation device to cause the agitation device to turn on for a selected amount of time corresponding to the remaining useful life of the absorbent media and then transmitting another control signal to the agitation device to cause the agitation device to turn off, transmitting the control signal to the dispenser to cause the dispenser to dispense absorbent media; transmitting the control signal to the dispenser to cause the dispenser to not dispense absorbent media; transmitting the control signal to the dispenser to cause the dispenser to dispense indicator; transmitting the control signal to the dispenser to cause the dispenser to not dispense indicator; transmitting the control signal to an audio, visual, tactile, and/or haptic device of the toilet to cause the audio, visual, tactile, and/or haptic device of the toilet to generate an audio, visual, tactile, and/or haptic alert, transmitting a communication to an internal or external device indicating the remaining useful life of the absorbent media is to be displayed, and/or transmitting information to be displayed on a display.

6. The toilet apparatus of claim 1 wherein the control circuit processes the signal to determine, based on data in the signal, an amount of the indicator that is detected by the sensor, determines a remaining useful life of the absorbent media based on the value or other data in the signal, and determines the one or more actions based, in part, on determining the remaining useful life of the absorbent media.

7. The toilet apparatus of claim 1 wherein the control circuit determines a current state of corrosion, decay, or dissolve of the indicator based on the data in the signal, comparing the current state to a known state in which the indicator is not corroded, decayed, or dissolved to determine a percentage of remaining indicator, and determining a remaining useful life of the absorbent media by using the percentage of remaining indicator as a corresponding percentage of remaining useful life of the absorbent media.

8. The toilet apparatus of claim 1 wherein the sensor comprises a proximity sensor that detects a presence of the indicator within a proximity of the sensor and/or an amount of the indicator present within the proximity of the sensor.

9. The toilet apparatus of claim 1 wherein the sensor detects a presence of the indicator within a detection zone of the sensor and/or an amount of the indicator present within the detection zone of the sensor.

10. The toilet apparatus of claim 1 wherein the sensor comprises at least one of an inductive, capacitive, or magnetic field sensing sensor that can detect an inductance, capacitance, or magnetic field corresponding to an amount of the indicator present in a detection zone of the sensor.

11. The toilet apparatus of claim 1 wherein the sensor detects a characteristic of the indicator that causes the indicator to be reduced or eliminated immediately or over time.

12. The toilet apparatus of claim 11 wherein the characteristic of the indicator comprises at least one of corrosion, dissolving, decay, and rusting.

13. The toilet apparatus of claim 1 wherein the indicator comprises at least one of a ferrous material, a ferromagnetic material, a nonferrous metal, and an alloy.

14. The toilet apparatus of claim 1 wherein the indicator comprises at least one of a biologic, a paramagnetic compound, and diamagnetic compound.

15. The toilet apparatus of claim 1 wherein the indicator comprises a characteristic that causes the indicator to be reduced or eliminated immediately or over time.

16. The toilet apparatus of claim 15 wherein the characteristic of the indicator comprises at least one of corrosion, dissolving, decay, and rusting.

17. The toilet apparatus of claim 1 further comprising an indicator concentrating element that concentrates the indicator at, in, or through a detection zone of the sensor.

18. The toilet apparatus of claim 17 wherein the indicator concentrating element attracts the indicator the indicator at, in, or through the detection zone of the sensor.

19. The toilet apparatus of claim 17 wherein the indicator concentrating element is magnetic to attract a ferromagnetic indicator.

20. The toilet apparatus of claim 17 wherein the indicator concentrating element is a non-ferrous plate having ferrous material attracting properties.

21. The toilet apparatus of claim 17 wherein the indicator concentrating element is placed at least one of at an interior of the material receiving bowl, at an exterior of the material receiving bowl, and at a bottom portion of the material receiving bowl.

22. The toilet apparatus of claim 1 wherein the opening is at the top of the waste material receiving bowl.

23. The toilet apparatus of claim 1 further comprising a bag to receive and retain waste material, the absorbent media, and the indicator when introduced through the opening.

24. The toilet apparatus of claim 1 further comprising an agitation device to agitate the absorbent media, the indicator, and the waste material to cause the absorbent media to at least substantially cover the waste material while the agitation device is not contacting the absorbent media and the waste material.

25. The toilet apparatus of claim 1 further comprising an agitation device to agitate the absorbent media, the indicator, and the waste material at a lower portion of the bag to cause the absorbent media to at least substantially cover the waste material while the agitation device is not contacting the absorbent media and the waste material.

26. A method for a toilet apparatus comprising:
providing a waste material receiving bowl having an opening to receive an absorbent media and indicator;
detecting, with a sensor, a presence of the indicator in the material receiving bowl when the indicator is present in the material receiving bowl and transmitting a signal indicating the indicator is present in the material receiving bowl; and
receiving the signal from the sensor at a control circuit, processing the signal at the control circuit to determine the indicator is present in the material receiving bowl, and transmitting a control signal from the control circuit to cause one or more actions by a component of the toilet apparatus when the indicator is present in the material receiving bowl.

27. The method of claim 26 wherein the control circuit causes the one or more actions to be taken by at least one of: transmitting a control signal to the agitation device to cause the agitation device to turn off, transmitting the control signal to the agitation device to cause the agitation device to keep off, transmitting the control signal to the agitation device to cause the agitation device to turn on for a selected amount of time, transmitting the control signal to the agitation device to cause the agitation device to turn on for a selected amount of time and then transmitting another control signal to the agitation device to cause the agitation device to off, transmitting the control signal to the dispenser to cause the dispenser to dispense absorbent media; transmitting the control signal to the dispenser to cause the dispenser to not dispense absorbent media; transmitting the control signal to the dispenser to cause the dispenser to dispense indicator; transmitting the control signal to the dispenser to cause the dispenser to not dispense indicator; transmitting the control signal to an audio, visual, tactile, and/or haptic device of the toilet to cause the audio, visual, tactile, and/or haptic device of the toilet to generate an audio, visual, tactile, and/or haptic alert, and/or transmitting information to be displayed on a display.

28. The method of claim 26 wherein the control circuit processes the signal to determine, based on data in the signal, an amount of the indicator that is detected by the sensor and determines the one or more actions based on, at least in part, determining the amount of the indicator detected in the detection zone of the sensor.

29. The method of claim 26 wherein the control circuit processes the signal to determine, based on data in the signal, an amount of the indicator that is detected by the sensor, determines a remaining useful life of the absorbent media based on the value or other data in the signal, and determines the one or more actions when the indicator is present and determining the remaining useful life of the absorbent media.

30. The toilet apparatus of claim 29 wherein the control circuit causes the one or more actions to be taken by at least one of: transmitting a control signal to the agitation device to cause the agitation device to turn off, transmitting the control signal to the agitation device to cause the agitation device to keep off, transmitting the control signal to the agitation device to cause the agitation device to turn on for a selected amount of time corresponding to the remaining useful life of the absorbent media, transmitting the control signal to the agitation device to cause the agitation device to turn on for a selected amount of time corresponding to the remaining useful life of the absorbent media and then transmitting another control signal to the agitation device to cause the agitation device to turn off, transmitting the control signal to the dispenser to cause the dispenser to dispense absorbent media; transmitting the control signal to the dispenser to cause the dispenser to not dispense absorbent media; transmitting the control signal to the dispenser to cause the dispenser to dispense indicator; transmitting the control signal to the dispenser to cause the dispenser to not dispense indicator; transmitting the control signal to an audio, visual, tactile, and/or haptic device of the toilet to cause the audio, visual, tactile, and/or haptic device of the toilet to generate an audio, visual, tactile, and/or haptic alert, transmitting a communication to an internal or external device indicating the remaining useful life of the absorbent media is to be displayed, and/or transmitting information to be displayed on a display.

31. The method of claim 26 wherein the control circuit processes the signal to determine, based on data in the signal, an amount of the indicator that is detected by the sensor, determines a remaining useful life of the absorbent media based on the value or other data in the signal, and determines the one or more actions when the indicator is present and determining the remaining useful life of the absorbent media.

32. The method of claim 26 wherein the control circuit determines a current state of corrosion, decay, or dissolve of the indicator based on the data in the signal, comparing the current state to a known state in which the indicator is not corroded, decayed, or dissolved to determine a percentage of remaining indicator, and determining a remaining useful life of the absorbent media by using the percentage of remaining indicator as a corresponding percentage of remaining useful life of the absorbent media.

33. The method of claim 26 further comprising detecting a presence of the indicator within a proximity of the sensor and/or an amount of the indicator present within the proximity of the sensor.

34. The method of claim 26 further comprising detecting a presence of the indicator within a detection zone of the sensor and/or an amount of the indicator present within the detection zone of the sensor.

35. The method of claim 26 further comprising using at least one of an inductive, capacitive, or magnetic field sensing sensor to detect an inductance, capacitance, or magnetic field corresponding to an amount of the indicator present in a detection zone of the sensor.

36. The method of claim 26 further comprising detecting a characteristic of the indicator that causes the indicator to be reduced or eliminated immediately or over time.

37. The method of claim 26 further comprising detecting a characteristic of the indicator that causes the indicator to be reduced or eliminated immediately or over time, wherein the characteristic of the indicator comprises at least one of corrosion, dissolving, decay, and rusting.

38. The method of claim 26 wherein the indicator is selected from at least one of a ferrous material, a ferromagnetic material, a nonferrous metal, and an alloy.

39. The method of claim 26 wherein the indicator is selected from at least one of a biologic, a paramagnetic compound, and diamagnetic compound.

40. The method of claim 26 wherein the indicator is selected with a characteristic that causes the indicator to be reduced or eliminated immediately or over time.

41. The method of claim 26 wherein the indicator is selected with a characteristic that causes the indicator to be reduced or eliminated immediately or over time, and the characteristic of the indicator comprises at least one of corrosion, dissolving, decay, and rusting.

42. The method of claim 26 further comprising using an indicator concentrating element that concentrates the indicator at, in, or through a detection zone of the sensor.

43. The method of claim 42 wherein the indicator concentrating element attracts the indicator the indicator at, in, or through the detection zone of the sensor.

44. The method of claim 42 wherein the indicator concentrating element attracts a ferromagnetic indicator.

45. The method of claim 42 wherein the indicator concentrating element is selected as a non-ferrous plate having ferrous material attracting properties.

46. The method of claim 42 wherein the indicator concentrating element is placed at least one of at an interior of the material receiving bowl, at an exterior of the material receiving bowl, and at a bottom portion of the material receiving bowl.

47. The method of claim 26 wherein the opening is at the top of the waste material receiving bowl.

48. The method of claim 26 further comprising providing a bag to receive and retain waste material, the absorbent media, and the indicator when introduced through the opening.

49. The method of claim 26 further comprising agitating the absorbent media, the indicator, and the waste material to cause the absorbent media to at least substantially cover the waste material while the agitation device is not contacting the absorbent media and the waste material.

50. The method of claim 26 further comprising agitating the absorbent media, the indicator, and the waste material at a lower portion of the bag to cause the absorbent media to at least substantially cover the waste material while the agitation device is not contacting the absorbent media and the waste material.

* * * * *